(12) United States Patent
Inoue et al.

(10) Patent No.: US 7,672,770 B2
(45) Date of Patent: Mar. 2, 2010

(54) DECELERATION CONTROL APPARATUS FOR A VEHICLE

(75) Inventors: Yuji Inoue, Nisshin (JP); Atsushi Tabata, Okazaki (JP); Atsushi Kamada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 889 days.

(21) Appl. No.: 11/453,032

(22) Filed: Jun. 15, 2006

(65) Prior Publication Data

US 2006/0287798 A1    Dec. 21, 2006

(30) Foreign Application Priority Data

Jun. 15, 2005    (JP) ............................. 2005-175616

(51) Int. Cl.
*B60K 31/00*    (2006.01)
(52) U.S. Cl. .......................................... 701/70; 701/87
(58) Field of Classification Search ....................... None
See application file for complete search history.

(56) References Cited

U.S. PATENT DOCUMENTS

| | | | | |
|---|---|---|---|---|
| 5,002,343 A | * | 3/1991 | Brearley et al. ................ | 303/7 |
| 5,080,445 A | * | 1/1992 | Brearley et al. ................ | 303/7 |
| 6,144,928 A | * | 11/2000 | Leimbach et al. ........... | 702/173 |
| 6,332,354 B1 | * | 12/2001 | Lalor et al. .................... | 73/121 |
| 6,459,980 B1 | | 10/2002 | Tabata et al. | |
| 6,478,716 B2 | * | 11/2002 | Onimaru et al. ............. | 477/118 |

FOREIGN PATENT DOCUMENTS

| | | |
|---|---|---|
| JP | 8-164832 A | 6/1996 |
| JP | 2001-233196 A | 8/2001 |
| JP | 2003-267088 A | 9/2003 |
| WO | WO 00/46063 A1 | 8/2000 |

OTHER PUBLICATIONS

Japanese Office Action dated Nov. 4, 2009.

* cited by examiner

*Primary Examiner*—Michael J. Zanelli
(74) *Attorney, Agent, or Firm*—Sughrue Mion, PLLC

(57) ABSTRACT

A deceleration control apparatus to achieve the intended level of deceleration performance regardless of whether braking performance is changed by towing an object such as a trailer, and to reduce the possibility that a driver feels uncomfortable due to a change in the level of deceleration performance while the vehicle is running. Vehicle weight is calculated based on the actual running state of a vehicle, and it is determined whether the vehicle is towing an object based on the vehicle weight. When the vehicle is stationary, a deceleration pattern (the rate of change in a target deceleration) is changed based on whether the vehicle is towing an object. Therefore, it is possible to achieve the intended level of deceleration performance that matches the level of driver's request for deceleration, regardless of whether the vehicle weight is changed by towing an object.

26 Claims, 13 Drawing Sheets

FIG. 2B

|  | C1 | C2 | C3 | C4 | B1 | B2 | F1 | GEAR RATIO |
|---|---|---|---|---|---|---|---|---|
| P |  |  |  |  |  |  |  |  |
| Rev1 |  |  | O |  |  | O |  | 4.022 |
| Rev2 |  |  |  | O |  | O |  | 2.158 |
| N |  |  |  |  |  |  |  |  |
| 1st | O |  |  |  | (O) | O |  | 4.495 |
| 2nd | O |  |  | O |  |  |  | 2.697 |
| 3rd | O |  | O |  |  |  |  | 1.864 |
| 4th | O |  |  | O |  |  |  | 1.471 |
| 5th | O | O |  |  |  |  |  | 1.238 |
| 6th |  | O |  | O |  |  |  | 1.000 |
| 7th |  | O | O |  |  |  |  | 0.823 |
| 8th |  | O |  | O |  |  |  | 0.683 |

($\rho 1=0.463, \rho 2=0.463, \rho 3=0.415$)

DECELERATION CONTROL APPARATUS FOR A VEHICLE

INCORPORATION BY REFERENCE

The disclosure of Japanese Patent Application No. 2005-175616 filed on Jun. 15, 2005, including the specification, drawings and abstract is incorporated herein by reference in its entirety.

BACKGROUND OF THE INVENTION

1. Field of the Invention

The invention relates to a deceleration control apparatus for a vehicle. More particularly, an embodiment of the invention relates to a deceleration control apparatus that changes the relation between the mode of operation performed by the driver and a target deceleration, based on whether a vehicle is towing an object.

2. Description of the Related Art

PCT International Publication No. WO00/46063 describes an example of a deceleration control apparatus which includes (a) a target-deceleration setting means that is operated by a driver of a vehicle, and which sets a target deceleration based on a mode of operation performed by the driver, according to a predetermined relation between the mode of operation performed by the driver and the target deceleration; and (b) a deceleration control means for controlling a deceleration of the vehicle by changing a braking force based on the target deceleration set by the target-deceleration setting means. The deceleration control apparatus includes deceleration-request operating members such as a shift lever, a Decel switch, and a Can-Decel switch. The target deceleration is changed continuously or stepwise, in accordance with a change in the mode of operation of the deceleration-request operating member, that is, the number of times that the deceleration-request operating member is operated, or the time period during which the deceleration-request operating member is operated.

However, in a vehicle that can tow a trailer such as a travel trailer, a trailer for carrying a boat, or a trailer for carrying a load, the vehicle weight greatly changes according to whether the vehicle is towing such a trailer. Accordingly, the level of braking performance, that is, a deceleration corresponding to a braking force changes according to whether the vehicle is towing a trailer. As a result, the intended level of deceleration performance may not be achieved. For example, a sufficient level of deceleration performance may not be achieved (i.e., the vehicle may not be sufficiently decelerated). Alternatively, the vehicle may be excessively decelerated. Thus, the driver needs to operate the deceleration-request operating means in different modes to achieve a certain level of deceleration performance, according to the vehicle weight. This impairs the usability of the deceleration control. This problem similarly occurs when the vehicle tows a disabled vehicle or the like.

To prevent such a change in the deceleration performance, a target deceleration (set based on the mode of predetermined operation performed by the driver) may be changed by changing the relation between the mode of operation performed by the driver and the target deceleration, based on whether a vehicle is towing an object. For example, when the vehicle is towing an object, the target deceleration is set to a large value as compared to when the vehicle is not towing an object, even if the driver performs operation in the same mode as when the vehicle is not towing an object. However, for example, if the relation between the mode of operation performed by the driver and the target deceleration is automatically changed, and accordingly the level of deceleration performance corresponding to the mode of operation is changed while the vehicle is running, the driver may feel uncomfortable, and the usability of the deceleration control may be impaired.

SUMMARY OF THE INVENTION

In view of the above, it is an object of the invention to reduce the possibility that a driver feels uncomfortable due to a change in the level of deceleration performance, in the case where a target deceleration set based on the mode of operation performed by the driver is changed, for example, based on whether the vehicle is towing an object.

To achieve the aforementioned object; according to a first embodiment, a deceleration control apparatus for a vehicle includes (a) a target-deceleration setting means which is operated by a driver of a vehicle, and which sets a target deceleration based on a mode of an operation performed by the driver according to a predetermined relation between the mode of operation performed by the driver and the target deceleration; and (b) a deceleration control means for controlling a deceleration of the vehicle by changing a braking force based on the target deceleration set by the target-deceleration setting means. The deceleration control apparatus is characterized by including (c) a relation changing means for changing the relation between the mode of operation performed by the driver and the target deceleration when a predetermined condition is satisfied; and (d) a change prohibition means for prohibiting a change in the relation between the mode of operation performed by the driver and the target deceleration when the vehicle runs at a vehicle speed higher than a predetermined vehicle speed.

According to a second embodiment, in the deceleration control apparatus for a vehicle according to the first embodiment, (a) a vehicle weight determination means for determining vehicle weight is provided; and (b) the predetermined condition relates to the vehicle weight, and the relation changing means changes the relation based on the vehicle weight.

According to a third embodiment, in the deceleration control apparatus for a vehicle according to the second embodiment, (a) the deceleration control means changes the braking force by controlling an operating state of a power source for driving the vehicle; and (b) the vehicle weight determination means determines the vehicle weight based on the operating state of the power source and a change in the vehicle speed.

According to a fourth embodiment, in the deceleration control apparatus for a vehicle according to the third embodiment, (a) the power source for driving the vehicle is an engine, and the deceleration control means changes the braking force by controlling an operating state of the engine; and (b) the vehicle weight determination means determines the vehicle weight based on the operating state of the engine and the change in the vehicle speed.

According to a fifth embodiment, in the deceleration control apparatus for a vehicle according to the second embodiment, (a) the deceleration control means changes the braking force by controlling a speed ratio of a transmission provided between the power source for driving the vehicle and a driving wheel; and (b) the vehicle weight determination means determines the vehicle weight based on the speed ratio of the transmission and the change in the vehicle speed.

According to a sixth embodiment, in the deceleration control apparatus for a vehicle according to the second embodiment, (a) the vehicle weight determination means determines whether the vehicle is towing an object, based on a change in the vehicle weight; and (b) the relation changing means changes the relation based on whether the vehicle is towing an object.

According to a seventh embodiment, in the deceleration control apparatus for a vehicle according to the first embodiment, (a) a tow determination means for determining whether the vehicle is towing an object is provided; and (b) the predetermined condition relates to whether the vehicle is towing an object, and the relation changing means changes the relation based on whether the vehicle is towing an object.

According to an eighth embodiment, in the deceleration control apparatus for a vehicle according to the sixth embodiment or the seventh embodiment, the relation changing means changes the relation so that the target deceleration corresponding to the mode of operation performed by the driver is large when the vehicle is towing an object, as compared to when the vehicle is not towing an object.

According to a ninth embodiment, in the deceleration control apparatus for a vehicle according to the sixth embodiment or the seventh embodiment, the relation changing means changes the relation so that the target deceleration corresponding to the mode of operation performed by the driver is changed in large steps when the vehicle is towing an object, as compared to when the vehicle is not towing an object.

According to a tenth embodiment, in the deceleration control apparatus for a vehicle according to the sixth embodiment or the seventh embodiment, the relation changing means changes the relation so that the target deceleration corresponding to the mode of operation performed by the driver is changed at a large rate when the vehicle is towing an object, as compared to when the vehicle is not towing an object.

According to an eleventh embodiment, in the deceleration control apparatus for a vehicle according to the sixth embodiment or the seventh embodiment, the relation changing means changes the relation so that a lower limit value of the target deceleration corresponding to the mode of operation performed by the driver is large when the vehicle is towing an object, as compared to when the vehicle is not towing an object.

According to a twelfth embodiment, a deceleration control apparatus for a vehicle includes (a) a target-deceleration setting means which is operated by a driver of a vehicle, and which sets a target deceleration based on a mode of a predetermined operation performed by the driver; and (b) a deceleration control means for controlling a deceleration of the vehicle by changing a braking force based on the target deceleration set by the target-deceleration setting means. The control apparatus includes (c) a changing means for changing the target deceleration set based on the mode of predetermined operation performed by the driver when a predetermined condition is satisfied; and (d) a change prohibition means for prohibiting a change in the target deceleration set based on the mode of predetermined operation performed by the driver when the vehicle runs at a vehicle speed higher than a predetermined vehicle speed.

According to a thirteenth embodiment, in the deceleration control apparatus for a vehicle according to the twelfth embodiment, (a) a vehicle weight determination means for determining vehicle weight is provided; and (b) the predetermined condition relates to the vehicle weight, and the changing means changes, based on the vehicle weight, the target deceleration set based on the mode of predetermined operation performed by the driver.

According to a fourteenth embodiment, in the deceleration control apparatus for a vehicle according to the thirteenth embodiment, (a) the deceleration control means changes the braking force by controlling an operating state of a power source for driving the vehicle; and (b) the vehicle weight determination means determines the vehicle weight based on the operating state of the power source and a change in the vehicle speed.

According to a fifteenth embodiment, in the deceleration control apparatus for a vehicle according to the fourteenth embodiment, (a) the power source for driving the vehicle is an engine, and the deceleration control means changes the braking force by controlling an operating state of the engine; and (b) the vehicle weight determination means determines the vehicle weight based on the operating state of the engine and the change in the vehicle speed.

According to a sixteenth embodiment, in the deceleration control apparatus for a vehicle according to the thirteenth embodiment, (a) the deceleration control means changes the braking force by controlling a speed ratio of a transmission provided between the power source for driving the vehicle and a driving wheel; and (b) the vehicle weight determination means determines the vehicle weight based on the speed ratio of the transmission and the change in the vehicle speed.

According to a seventeenth embodiment, in the deceleration control apparatus for a vehicle according to the thirteenth embodiment, (a) the vehicle weight determination means determines whether the vehicle is towing an object, based on a change in the vehicle weight; and (b) the changing means changes, based on whether the vehicle is towing an object, the target deceleration set based on the mode of predetermined operation performed by the driver.

According to an eighteenth embodiment, in the deceleration control apparatus for a vehicle according to the twelfth embodiment, (a) a tow determination means for determining whether the vehicle is towing an object is provided; and (b) the predetermined condition relates to whether the vehicle is towing an object, and the changing means changes, based on whether the vehicle is towing an object, the target deceleration set based on the mode of predetermined operation performed by the driver.

According to a nineteenth embodiment, in the deceleration control apparatus for a vehicle according to the seventeenth embodiment or the eighteenth embodiment, the changing means changes the target deceleration set based on the mode of predetermined operation performed by the driver so that the target deceleration is large when the vehicle is towing an object, as compared to when the vehicle is not towing an object.

According to a twentieth embodiment, in the deceleration control apparatus for a vehicle according to the seventeenth embodiment or the eighteenth embodiment, the changing means changes the target deceleration set based on the mode of predetermined operation performed by the driver so that the target deceleration is changed in large steps in accordance with a change in the mode of predetermined operation performed by the driver when the vehicle is towing an object, as compared to when the vehicle is not towing an object.

According to a twenty-first embodiment, in the deceleration control apparatus for a vehicle according to the seventeenth embodiment or the eighteenth embodiment, the changing means changes the target deceleration set based on the mode of predetermined operation performed by the driver so that the target deceleration is changed at a large rate in accordance with a change in the mode of predetermined operation when the vehicle is towing an object, as compared to when the vehicle is not towing an object.

According to a twenty-second embodiment, in the deceleration control apparatus for a vehicle according to the seventeenth embodiment or the eighteenth embodiment, (a) the target-deceleration setting means includes a lower-limitvalue setting means for setting a lower limit value of the target deceleration; and (b) the changing means increases the lower limit value of the target deceleration set by the lower-limit-value setting means when the vehicle is towing an object, as compared to when the vehicle is not towing an object.

In the deceleration control apparatus for a vehicle according to each of the first embodiment to the eleventh embodiment, the relation between the mode of operation performed by the driver and the target deceleration is changed when a predetermined condition is satisfied. For example, the relation is changed based on whether the vehicle is towing an object. Therefore, it is possible to achieve the intended level of deceleration performance that matches the mode of operation performed by the driver, regardless of whether the vehicle is towing an object. This improves the usability of the deceleration control. Further, a change in the relation between the mode of operation and the target deceleration is prohibited when the vehicle runs at the vehicle speed higher than the predetermined vehicle speed. Therefore, it is possible to reduce the possibility that the usability of the deceleration control is impaired and the driver feels uncomfortable due to a change in the level of the deceleration performance corresponding to the mode of operation.

According to the second embodiment, the vehicle weight determination means is provided, and the relation changing means changes the relation between the mode of operation and the target deceleration, based on the vehicle weight. Therefore, it is possible to achieve the intended level of deceleration performance that matches the mode of operation performed by the driver, regardless of whether the vehicle is towing an object. This improves the usability of the deceleration control.

According to the third embodiment, the braking force is changed by controlling the operating state of the power source for driving the vehicle, and the vehicle weight is determined based on the operating state of the power source and the change in the vehicle speed. The relation between the mode of operation and the target deceleration is changed based on the vehicle weight. Therefore, it is possible to more appropriately execute the deceleration control using the power-source brake, based on the vehicle weight. Also, because the vehicle weight is determined based on the operating state of the power source and the change in the vehicle speed, a sensor such as a weight sensor or a towing load sensor is not necessary. Therefore, the deceleration control apparatus can be easily configured at low cost. Further, it is possible to reduce the possibility that the vehicle weight is erroneously determined due to electric failure in such a sensor. Accordingly, high reliability can be provided.

According to the fifth embodiment, the braking force is changed by controlling the speed ratio of the transmission, and the vehicle weight is determined based on the speed ratio of the transmission and the change in the vehicle speed. The relation between the mode of operation and the target deceleration is changed based on the vehicle weight. Therefore, it is possible to more appropriately execute the deceleration control using the speed ratio of the transmission, based on the vehicle weight. Also, because the vehicle weight is determined based on the speed ratio of the transmission and the change in the vehicle speed, a sensor such as a weight sensor or a towing load sensor is not necessary. Therefore, the deceleration control apparatus can be easily configured at low cost. Further, it is possible to reduce the possibility that the vehicle weight is erroneously determined due to electric failure in such a sensor. Accordingly, high reliability can be provided.

According to the sixth embodiment, it is determined whether the vehicle is towing an object based on the change in the vehicle weight, and the relation between the mode of operation and the target deceleration is changed based on whether the vehicle is towing an object. Therefore, it is possible to achieve the intended level of deceleration performance that matches the mode of operation performed by the driver, regardless of whether the vehicle is towing an object. This improves the usability of the deceleration control.

According to the seventh embodiment, the tow determination means determines whether the vehicle is towing an object, and the relation between the mode of operation and the target deceleration is changed based on whether the vehicle is towing an object. Therefore, it is possible to achieve the intended level of deceleration performance that matches the mode of operation performed by the driver, regardless of whether the vehicle is towing an object. This improves the usability of the deceleration control.

According to the eighth embodiment, the target deceleration corresponding to the mode of operation performed by the driver is large when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the ninth embodiment, the target deceleration corresponding to the mode of operation performed by the driver is changed in large steps when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the tenth embodiment, the target deceleration corresponding to the mode of operation performed by the driver is changed at a large rate when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the eleventh embodiment, the lower limit value of the target deceleration corresponding to the mode of operation performed by the driver is large when the vehicle is towing an object, as compared to when the vehicle is not towing an object. Therefore, when the vehicle weight is increased by towing a trailer or the like, for example, the target deceleration is set to a large value from the beginning, a large braking force can be generated, and the intended level of deceleration performance can be achieved quickly. Also, even if the driver performs operation to decrease the target deceleration, the target deceleration is maintained at a large value as compared to when the vehicle is not towing the trailer or the like. As a result, a large braking force that matches the vehicle weight can be generated. This improves usability of the deceleration control.

The twelfth embodiment is different from the first embodiment in that the relation between the mode of operation performed by the driver and the target deceleration is not described in the twelfth embodiment. However, the target-deceleration setting means sets the target deceleration based on the mode of predetermined operation performed by the driver, and the changing means changes the target deceleration set based on the mode of predetermined operation performed by the driver when the predetermined condition is satisfied. Thus, the concept of the twelfth embodiment is substantially broader than that of the first embodiment, and the effects of the twelfth embodiment are the same as that of the first embodiment. As described above, the target deceleration set based on the mode of predetermined operation performed by the driver is changed when the predetermined condition is satisfied. For example, the target deceleration is changed based on whether the vehicle is towing an object. Therefore, it is possible to achieve the intended level of deceleration performance that matches the mode of operation performed by the driver, regardless of whether the vehicle is towing an object. This improves the usability of the deceleration control. Further, the change in the target deceleration set based on the mode of predetermined operation is prohibited when the vehicle runs at the vehicle speed higher than the predetermined vehicle speed. Therefore, it is possible to reduce the possibility that the usability of the deceleration control is impaired and the driver feels uncomfortable due to a change in the level of the deceleration performance corresponding to the mode of predetermined operation.

The thirteenth embodiment to the twenty-second embodiment correspond to the second embodiment to the eleventh embodiment, respectively. Thus, the effects of the thirteenth embodiment to the twenty-second embodiment are the same as those of the second embodiment to the eleventh embodiment, respectively. That is, according to the thirteenth embodiment, the vehicle weight determination means is provided, and the changing means changes, based on the vehicle weight, the target deceleration set based on the mode of predetermined operation performed by the driver. Therefore, it is possible to achieve the intended level of deceleration performance that matches the mode of operation performed by the driver, regardless of whether the vehicle is towing an object. This improves the usability of the deceleration control.

According to the fourteenth embodiment, the braking force is changed by controlling the operating state of the power source for driving the vehicle, and the vehicle weight is determined based on the operating state of the power source and the change in the vehicle speed. The target deceleration set based on the mode of predetermined operation performed by the driver is changed based on the vehicle weight. Therefore, it is possible to more appropriately execute the deceleration control using the power-source brake, based on the vehicle weight. Also, because the vehicle weight is determined based on the operating state of the power source and the change in the vehicle speed, a sensor such as a weight sensor or a towing load sensor is not necessary. Therefore, the deceleration control apparatus can be easily configured at low cost. Further, it is possible to reduce the possibility that the vehicle weight is erroneously determined due to electric failure in such a sensor. Accordingly, high reliability can be provided.

According to the sixteenth embodiment, the braking force is changed by controlling the speed ratio of the transmission, and the vehicle weight is determined based on the speed ratio of the transmission and the change in the vehicle speed. The target deceleration set based on the mode of predetermined operation performed by the driver is changed based on the vehicle weight. Therefore, it is possible to more appropriately execute the deceleration control using the speed ratio of the transmission, based on the vehicle weight. Also, because the vehicle weight is determined based on the speed ratio of the transmission and the change in the vehicle speed, a sensor such as a weight sensor or a towing load sensor is not necessary. Therefore, the deceleration control apparatus can be easily configured at low cost. Further, it is possible to reduce the possibility that the vehicle weight is erroneously determined due to electric failure in such a sensor. Accordingly, high reliability can be provided.

According to the seventeenth embodiment, it is determined whether the vehicle is towing an object based on the change in the vehicle weight, and the target deceleration set based on the mode of predetermined operation performed by the driver is changed based on whether the vehicle is towing an object. Therefore, it is possible to achieve the intended level of deceleration performance that matches the mode of operation performed by the driver, regardless of whether the vehicle is towing a trailer, a disabled vehicle, or the like. This improves the usability of the deceleration control.

According to the eighteenth embodiment, the tow determination means determines whether the vehicle is towing an object, and the target deceleration set based on the mode of predetermined operation performed by the driver is changed based on whether the vehicle is towing an object. Therefore, it is possible to achieve the intended level of deceleration performance that matches the mode of operation performed by the driver, regardless of whether the vehicle is towing a trailer, a disabled vehicle, or the like. This improves the usability of the deceleration control.

According to the nineteenth embodiment, the target deceleration set based on the mode of predetermined operation performed by the driver is large when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the twentieth embodiment, the target deceleration is changed in large steps in accordance with a change in the mode of predetermined operation, when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the twenty-first embodiment, the target deceleration set based on the mode of predetermined operation performed by the driver is changed at a large rate in accordance with a change in the mode of predetermined operation when the vehicle is towing an object, as compared to when the vehicle is not towing an object. Therefore, when the vehicle weight is increased by towing a trailer or the like, a large braking force can be generated and the intended level of deceleration performance can be achieved quickly by performing operation in the same mode as when the vehicle is not towing a trailer or the like.

According to the twenty-second embodiment, the lower limit value of the target deceleration set by the lower-limit-value setting means is large when the vehicle is towing an object, as compared to when the vehicle is not towing an object. Therefore, when the vehicle weight is increased by towing a trailer or the like, for example, the target deceleration is set to a large value from the beginning, a large braking force can be generated, and the intended level of deceleration performance can be achieved quickly. Also, even if the driver performs operation to decrease the target deceleration, the target deceleration is maintained at a large value as compared to when the vehicle is not towing the trailer or the like. As a result, a large braking force that matches the vehicle weight can be generated. This improves usability of the deceleration control.

The deceleration control apparatus for a vehicle according to the various embodiments is appropriately used, for example, in a vehicle in which an engine and a rotary machine are provided to supply power to drive wheels. However, the deceleration control apparatus may be used in various kinds of vehicles. For example, the deceleration control apparatus may be used in vehicles in which only an engine is provided, or only a rotary machine is provided to supply power to a drive wheel. The term "rotary machine" signifies "rotary electric machine (JIS Z9212)". The rotary machine may be an electric motor that converts electric energy to rotary motion, a generator that converts rotary motion to electric energy, or a motor-generator that converts electric energy to rotary motion, and converts rotary motion to electric energy.

The various embodiments may be applied to various kinds of vehicles. For example, the embodiments may be applied to engine-driven vehicles in which only an engine is used as a power source, electric vehicles in which an electric motor or a motor-generator is used as a power source, and hybrid vehicles in which an engine and an electric motor or a motor-generator are used as power sources. More specifically, the embodiments may be applied to a parallel hybrid vehicle and a series hybrid vehicle. In the parallel hybrid vehicle, power generated by an engine can be directly transmitted to a drive wheel. In the series hybrid vehicle, power generated by an engine is used to generate electric power, and is not directly transmitted to a drive wheel.

The embodiments are appropriately applied to vehicles that can be connected to a trailer such as a travel trailer, a trailer for carrying a boat or the like, or a container truck for carrying a load. That is, the embodiments are appropriately applied to, for example, a passenger vehicle, a truck, or a tractor (a trailer-towing vehicle) that can tow such a trailer. The embodiments may be also applied to, for example, a passenger vehicle, or a truck that can tow a disabled vehicle using a rope, a chain, or the like. Further, the embodiments may be applied to, for example, a bus, a truck, or a commonly-used passenger vehicle which cannot tow a trailer, and whose weight and braking performance greatly changes according to the number of passengers or the load.

The target-deceleration setting means includes, for example, a deceleration-request operating member operated by the driver; and a target-deceleration control means that sets the target deceleration based on the mode of operation of the deceleration-request operating member. It is appropriate to employ the deceleration-request operating member that is manually operated. However, the deceleration-request operating member may be operated by any other means. For example, the deceleration-request operating member may be depressed by foot.

It is appropriate to employ a sequential type deceleration-request operating member that increases or decreases the level of request for deceleration based on the number of times that the deceleration-request operating member is operated, the time period during which the deceleration-request operating member is operated, or the like. For example, the deceleration-request operating member may be an operation lever that is operated to a position "Decel" and a position "Can-Decel" provided on opposite sides of a neutral position. In this case, operation lever is automatically returned to the neutral position. Also, the deceleration-request operating member may be a pair of operation levers or operation switches. In this case, each of operation levers (switches) is individually operated to increase or decrease the level of request for deceleration. Also, the deceleration-request operating member may be an operation lever that is operated to a plurality of operation positions corresponding to a plurality of levels of request for deceleration. In this case, the level of request for deceleration changes continuously or stepwise. Further, the deceleration-request operating member may be a slide switch whose output changes continuously or stepwise.

The deceleration-request operating member may be provided near the driver's seat. For example, the deceleration-request operating member may be provided in a center console portion on the side of the driver's seat, on a steering wheel, on a steering column, or on an instrument panel. For example, a shift lever that is operated to a forward-running position, a reverse-running position, and a neutral position may be used as the deceleration-request operating member. In this case, positions used for the deceleration control are provided. Naturally, the deceleration-request operating member other than this shift lever may be provided.

The deceleration control means controls the braking force based on the target deceleration set by the target-deceleration setting means. For example, the deceleration control means controls the engine braking force by changing the gear ratio or the speed ratio of an automatic transmission provided in a power transmission path between an engine and the driving wheel, or controls the torque of a rotary machine connected to the power transmission path, thereby generating a predetermined braking force. When the torque of the rotary machine is controlled to generate the predetermined braking force, for example, the braking force is increased by regenerative braking torque or powering torque in a reverse direction, or the braking force is decreased by powering torque in a normal direction. In addition to the power-source brake, a brake device such as a wheel brake provided in a wheel may be used to control the braking force. In some engines, the engine braking force can be controlled by controlling the opening/closing timing or the lift amount of an intake valve or an exhaust valve, or the opening amount of a throttle valve. Thus, the deceleration control means may have various configurations.

The transmission may be effectively used for the deceleration control that is executed using the power-source brake. For example, the transmission may be a multi-speed transmission such as a planetary gear type transmission or a parallel axes type transmission, or a continuously variable transmission such as a belt type transmission or a toroidal type transmission. However, the transmission is an essential component only in the fifth embodiment and the sixteenth embodiment.

The relation changing means changes the relation when the predetermined condition is satisfied. For example, the relation changing means changes the relation based on the vehicle weight as in the second embodiment, or based on whether the vehicle is towing an object as in the seventh embodiment. Also, in the case where the driver can perform a selection operation to select the relation, the relation changing means may change the relation based on whether the selection operation is performed. Alternatively, the relation changing means may automatically change the relation based on a running condition, such as a road surface friction coefficient $\mu$. Thus, the relation changing means may have various configurations. Similarly, the changing means in the twelfth embodiment may have various configurations.

The vehicle weight determination means in the second embodiment and the thirteenth embodiment determines the vehicle weight based on the operating state of the power source used for the deceleration control and the change in the vehicle speed, as in the third embodiment and the fourteenth embodiment. Alternatively, the vehicle weight determination means determines the vehicle weight based on the speed ratio of the transmission used for the deceleration control and the change in the vehicle speed, as in the fifth embodiment and the sixteenth embodiment. Alternatively, the vehicle weight determination means determines the vehicle weight based on the operating state of the power source, the speed ratio of the transmission, and the change in the vehicle speed. However, the vehicle weight determination means may determine the vehicle weight based on the operating state (e.g., braking torque) of a brake device that is not used for the deceleration control, and the change in the vehicle speed. In the third embodiment and the fourteenth embodiment, the vehicle weight is calculated based on the braking torque obtained based on the operating state of the power source and the actual change in the vehicle speed when the power-source brake is applied, for example, while the deceleration control is executed or while the vehicle is normally coasting with the accelerator pedal released. However, the vehicle weight may be calculated based on the operating state (driving torque) of the power source and the change in the vehicle speed when the vehicle is driven. In this case, it is preferable to correct the vehicle weight based on a road surface gradient or the like. The braking torque or the driving torque of the power source can be obtained using an equation, a data map, or the like that is set in advance using parameters such as the amount of air taken into the engine, the rotational speed of the engine, the opening amount of the throttle valve, electric current generated by the motor-generator, motor current, and the speed ratio of the automatic transmission.

In the second embodiment and the thirteenth embodiment, in the case where the deceleration control is executed by controlling a device (e.g., a brake device) other than the power source for driving the vehicle, the vehicle weight may be determined based on the operating state of the power source for driving the vehicle, and the change in the vehicle speed. Alternatively, the vehicle weight may be detected using a weight sensor, a towing load sensor, or the like. Thus, the vehicle weight determination means may have various configurations.

The tow determination means in the seventh embodiment and the eighteenth embodiment may determine whether the vehicle is towing an object based on the vehicle weight as in the sixth embodiment and the seventeenth embodiment. However, a towing switch may be provided to output a towing signal that indicates whether the vehicle is connected to an object such as a trailer, and the tow determination means may determine whether the vehicle is towing an object based on the towing signal. The towing switch may be mechanically turned on to output the towing signal when the vehicle is connected to an object such as a trailer. Alternatively, the towing switch may be turned on by the driver. Both of the vehicle weight and the towing switch may be used to determine whether the vehicle is towing an object. In this case, for example, if an affirmative determination is made based on the vehicle weight and an affirmative determination is also made based on the towing signal, it is finally determined that the vehicle is towing an object and the relation between the mode of operation and the target deceleration is changed.

For example, the relation changing means may select from among a plurality of relations based on the vehicle weight (for example, based on whether the vehicle is towing a trailer). However, in the case where the target-deceleration setting means includes a basic equation or a data map used to obtain the target deceleration using the mode of operation performed by the driver (i.e., the level of request for deceleration) as a parameter, the relation changing means may set a correction value or a correction coefficient used to correct the mode of operation or the target deceleration based on the vehicle weight. Thus, the relation changing means may have various configurations. In the sixth embodiment, the relation changing means changes the relation based on whether the vehicle is towing an object. However, in the second embodiment or the third embodiment, the relation changing means may change the relation in three or more steps, or continuously. The changing means in the twelfth embodiment may also have various configurations including the same configurations as the aforementioned configurations of the relation changing means.

For example, the relation is changed based on the vehicle weight so that substantially the same deceleration (i.e., the same deceleration performance) is achieved with respect to the same level of request for deceleration, regardless of the change in the vehicle weight. However, when the vehicle weight is large, the relation may be changed so that the deceleration is larger than that when the vehicle weight is small. Alternatively, when the vehicle weight is large, the relation may be changed so that the deceleration is increased, but the deceleration is still smaller than that when the vehicle weight is small.

For example, the change prohibition means determines whether the vehicle speed is lower than or equal to a predetermined vehicle speed, that is, whether the vehicle is stationary. When the vehicle is not stationary, the change in the relation is prohibited. Other conditions for permitting or prohibiting the change in the relation may be set. For example, the change in the relation may be permitted when the shift lever is at a position "N (neutral)" for interrupting power transmission, or a position "P (parking)" for parking the vehicle.

In the sixth embodiment, it is determined whether the vehicle is towing an object based on the change in the vehicle weight. However, in the case where the vehicle is towing a trailer for carrying a load, it is preferable to determine whether the weight of the load is larger than or equal to a predetermined value to determine whether the relation needs to be changed. That is, if the trailer is empty, it may be better not to change the relation. Therefore, in this case, the relation should be changed based on only the vehicle weight, and it is not necessary to determine whether the vehicle is towing an object.

BRIEF DESCRIPTION OF THE DRAWINGS

FIG. 2B is a table explaining operational states of engagement elements when each of a plurality of shift speeds is achieved;

DETAILED DESCRIPTION OF THE PREFERRED EMBODIMENTS

Figure 1A:
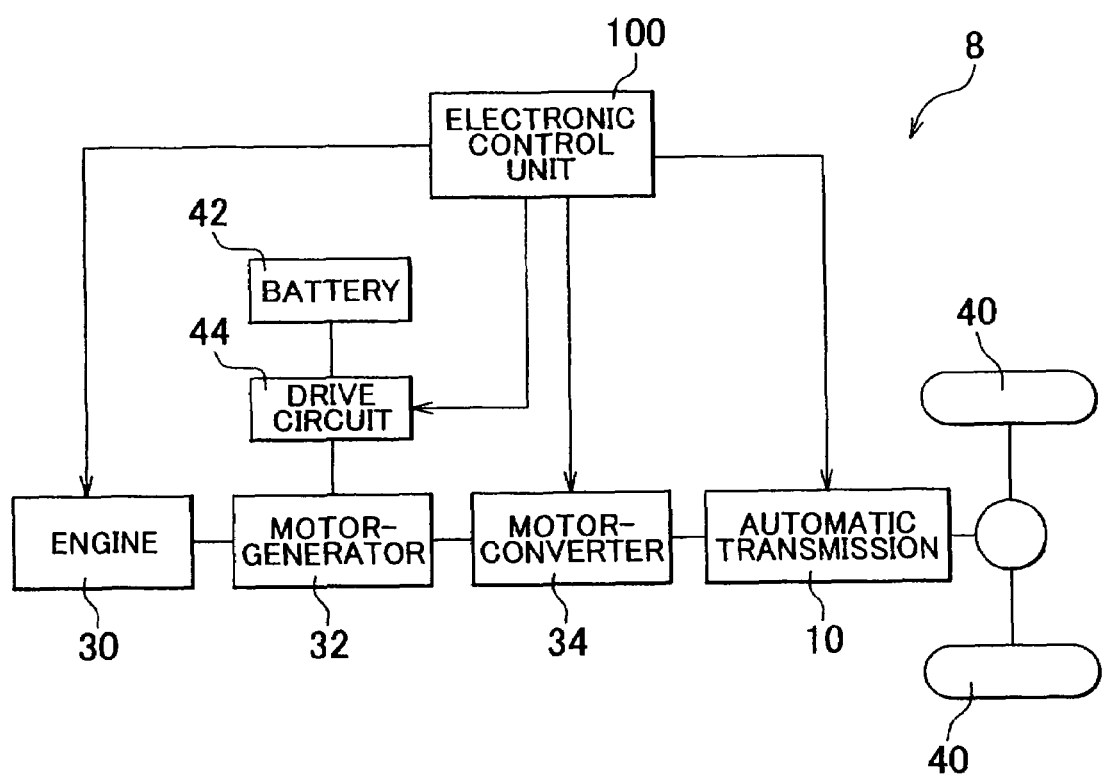
FIG. 1A is a block diagram showing the basic configuration of a drive apparatus in a hybrid vehicle to which the embodiments may be applied.
Figure 1B:
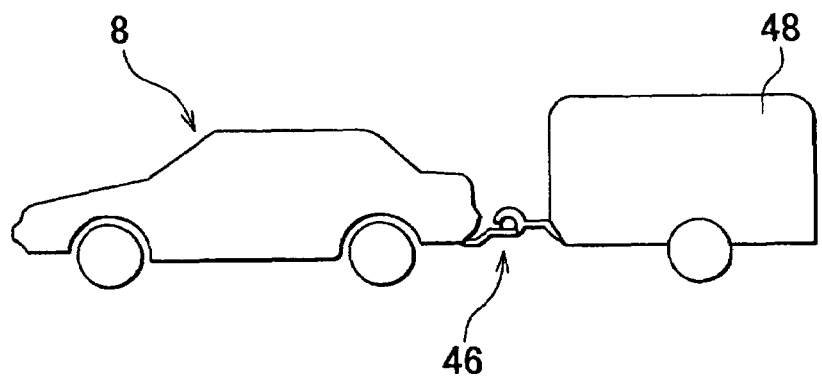
FIG. 1B is a schematic diagram showing the hybrid vehicle that is towing a trailer.

Hereinafter, embodiments will be described in detail with reference to drawings. Each of FIGS. 1A and 1B shows a hybrid vehicle 8 to which the embodiments may be applied. FIG. 1A is a block diagram showing the configuration of a drive apparatus of the hybrid vehicle 8. The drive apparatus includes an engine 30, a motor-generator 32, a torque converter 34, and an automatic transmission 10 that are coaxially provided in the order stated. An electronic control unit 100 controls the operating state of each of the engine 30, the motor-generator 32, the torque converter 34, and the automatic transmission 10. The drive apparatus rotates left and right drive wheels 40 via a propeller shaft, a differential gear unit, and the like. The hybrid vehicle 8 is an ordinary passenger vehicle, as shown in FIG. 1B. A connection device 46 for towing is provided in the rear portion of the hybrid vehicle 8. When the hybrid vehicle 8 tows a trailer 48, the hybrid vehicle 8 is connected to the trailer 48 using the connection device 46. The trailer 48 may be a travel trailer or a trailer for carrying a boat. The hybrid vehicle 8 can also tow a disabled vehicle using a rope, a chain, or the like.

The engine 30 and the motor-generator 32 are used as power sources for driving the hybrid vehicle 8. During deceleration, the engine 30 and the motor-generator 32 can be used to apply a power-source brake. A crankshaft and a motor shaft are integrally connected to each other. A clutch or the like that allows or interrupts power transmission between the crankshaft and the motor shaft may be provided, as required. The motor-generator 32 is connected to a battery 42 via a drive circuit 44 of an inverter or the like. When the battery 42 supplies electric energy to the motor-generator 32, the motor-generator 32 functions as an electric motor to generate driving force. When a regenerative control is executed using the motor-generator 32 as a generator, a braking force is applied to the vehicle 8, and the battery 42 is charged with electric power. The torque converter 34 is considered as a hydraulic power transmission device. A pump impeller is connected to the motor shaft of the motor-generator 32 so that the pump impeller is rotated integrally with the motor shaft.

Figure 2A:
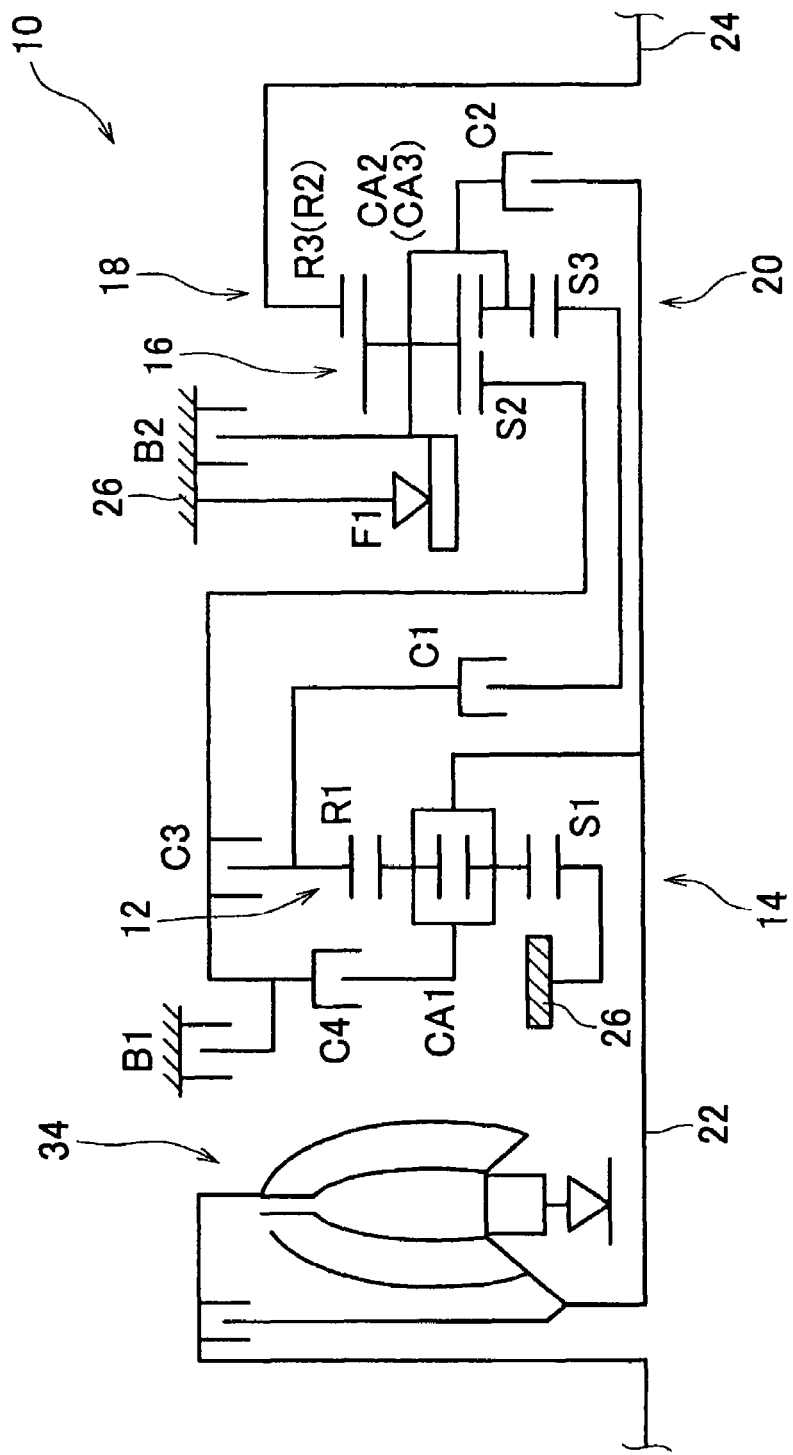
FIG. 2A is a schematic diagram showing an automatic transmission in FIG. 1A.

As shown in FIG. 2A, the automatic transmission 10 includes a first shifting portion 14 and a second shifting portion 20 that are coaxially disposed. The first shifting portion 14 includes a first planetary gear unit 12 of double pinion type. The second shifting portion 20 includes a second planetary gear unit 16 of single pinion type and a third planetary gear unit 18 of double pinion type. The rotational speed of an input shaft 22 connected to the turbine shaft of the torque converter 24 is changed, and the changed rotational speed is transmitted to the drive wheels 40 via an output shaft 24. Because the automatic transmission 10 and the torque converter 32 are substantially symmetric with respect to a center line, only the upper half parts of the automatic transmission 10 and the torque converter 32 are shown in FIG. 2A.

Figure 3:
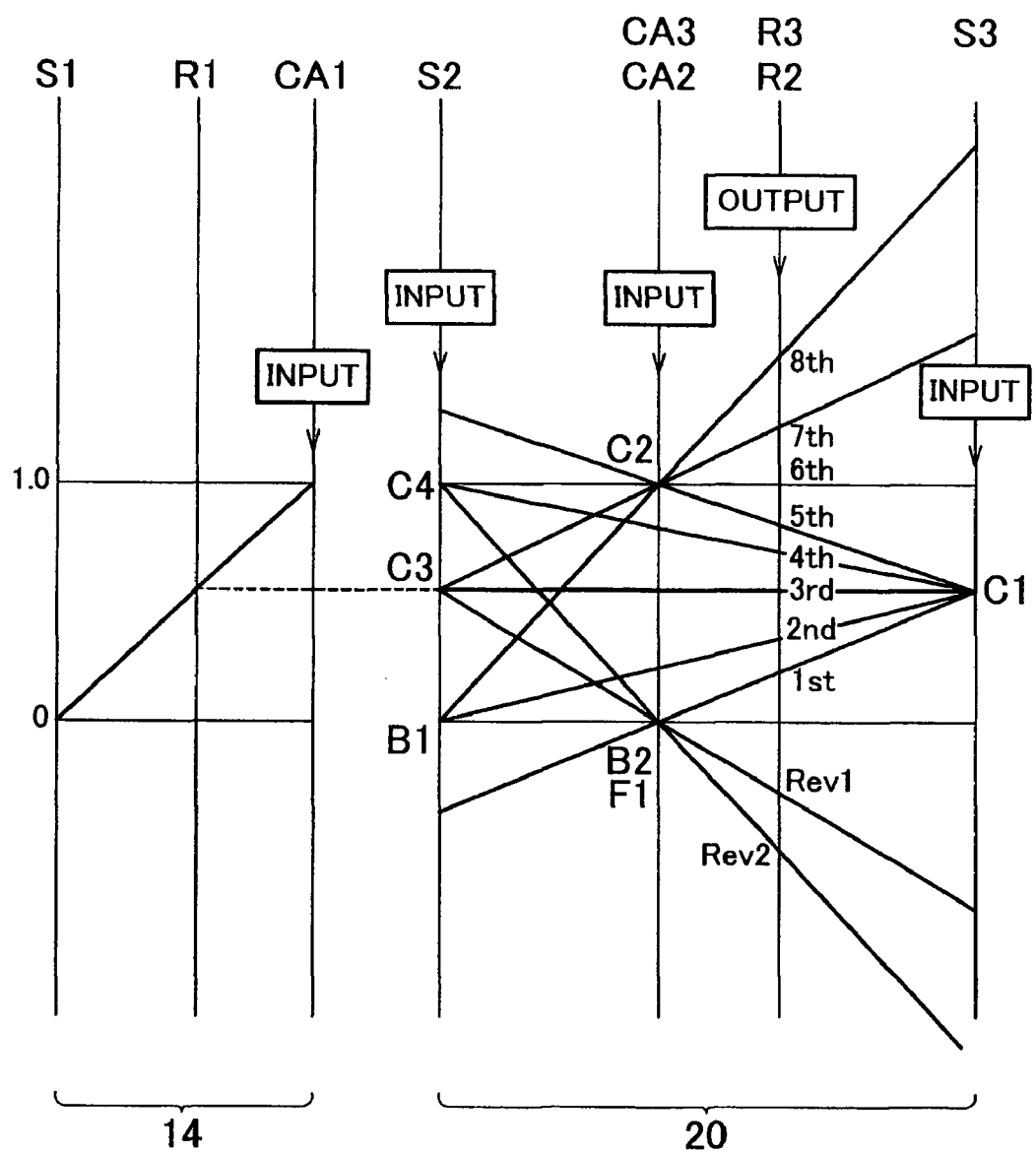
FIG. 3 is a collinear diagram of the automatic transmission in FIG. 2.

FIG. 3 is a collinear diagram showing the rotational speeds of the rotational elements (sun gears S1 to S3, carriers CA1 to CA3, and ring gears R1 to R3) of the first shifting portion 14 and the second shifting portion 20, using straight lines. The lower horizontal axis indicates that the rotational speed is "0". The upper horizontal axis indicates that the rotational speed is "1.0", that is, the rotational speed is the same as that of the input shaft 22. By changing the operating states of clutches C1 to C4 and brakes B1 and B2 (i.e., by engaging or disengaging the clutches C1 to C4 and brakes B1 and B2), eight forward speeds (i.e., a first forward speed "$1^{st}$" to an eighth forward speed "$8^{th}$") and two reverse speeds (i.e., a first reverse speed "Rev1" and a second reverse speed "Rev2") can be achieved. FIG. 2B is a table showing the operating states of the clutches C1 to C4, and the brakes B1 and B2 at each speed. A circle indicates that the clutch or the brake is engaged. A circle in parentheses indicates that the clutch or the brake is engaged only when the engine brake is applied. Because a one-way clutch F1 is provided in parallel with the brake B2 used to achieve the first forward speed "$1^{st}$", the brake B2 does not necessarily need to be engaged when the vehicle starts moving (when the vehicle accelerates). The speed ratio at each speed is appropriately determined based on the gear ratio (i.e., the number of teeth of the sun gear/the number of teeth of the ring gear) ρ1 of the first planetary gear unit 12, the gear ratio ρ2 of the second planetary gear unit 16, and the gear ratio ρ3 of the third planetary gear unit 18. The speed ratio at each speed in FIG. 2B is obtained when the gear ratio ρ1 is 0.463, the gear ratio ρ2 is 0.463, and the gear ratio ρ3 is 0.415. In FIG. 2A, a transmission case is denoted by a reference numeral 26.

Figure 4:
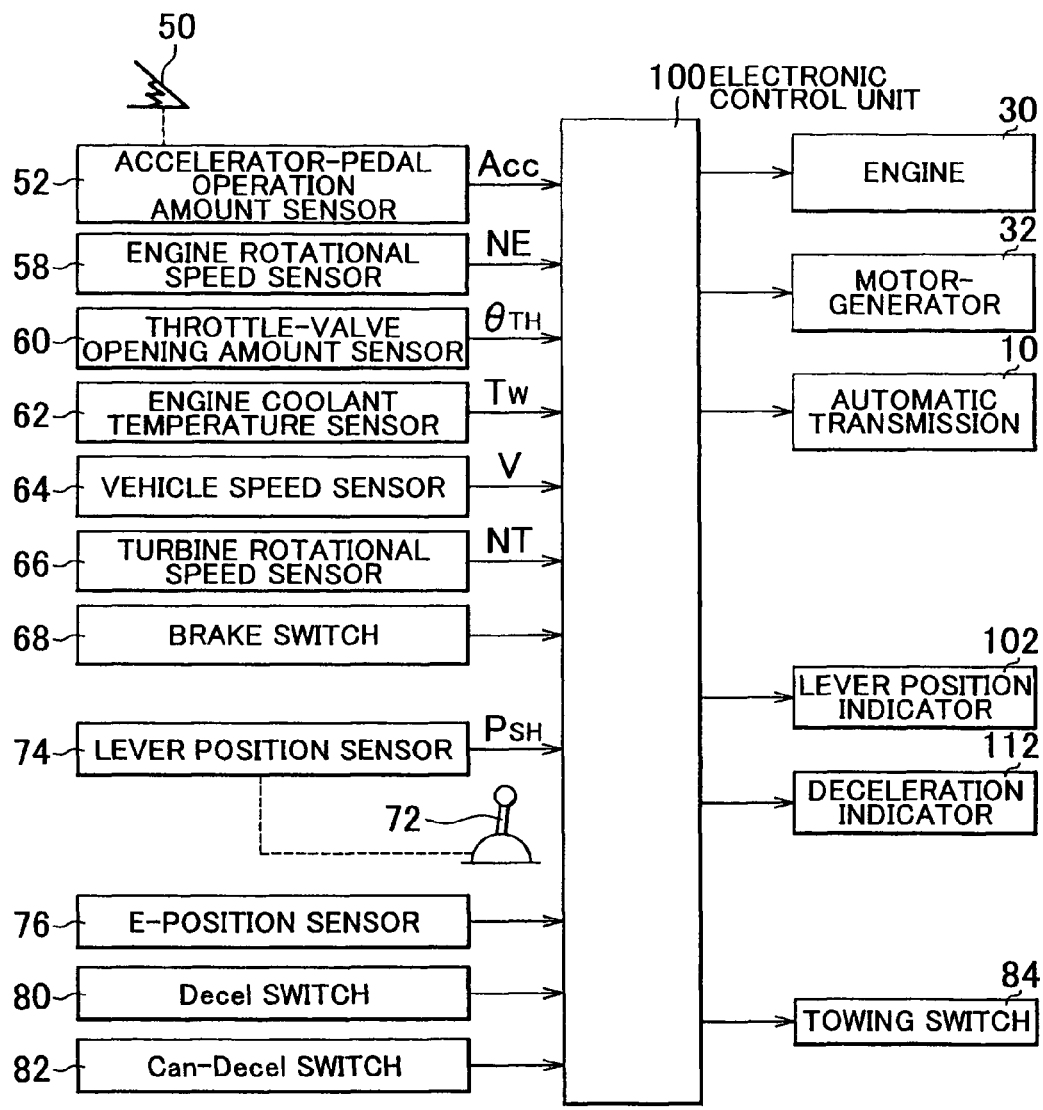
FIG. 4 is a block diagram showing the main portion of a control system provided in the drive apparatus for the vehicle in FIG. 1.

FIG. 4 is a block diagram schematically showing a control system that controls the automatic transmission 10, the engine 30, and the like. An accelerator-pedal operation amount sensor 52 detects operation amount Acc of an accelerator pedal 50. The depression of the accelerator pedal 50 varies in accordance with the amount of output required by the driver. The accelerator pedal 50 is considered as an accelerator operating member. The accelerator-pedal operation amount Acc is considered as the required amount of output. The control system also includes an engine rotational speed sensor 58, a throttle-valve opening amount sensor 60 with an idle switch, an engine coolant temperature sensor 62, a vehicle speed sensor 64, a turbine rotational speed sensor 66, a brake switch 68, a lever position sensor 74, an E-position sensor 76, a Decel switch 80, a Can-Decel switch 82, and a towing switch 84. The engine rotational speed sensor 58 detects a rotational speed NE of the engine 30 (that is equal to the rotational speed of the motor-generator 32). The throttle-valve opening amount sensor 60 with the idle switch detects the fully-closed state of an electronic throttle valve of the engine 30 (i.e., the idling state of the engine 30), or an opening amount θTH of the electronic throttle valve. The electronic throttle valve controls the amount of air taken into the engine 30. The engine coolant temperature sensor 62 detects a coolant temperature Tw of the engine 30. The vehicle speed sensor 66 detects a vehicle speed V (corresponding to a rotational speed Nout of the output shaft 24). The turbine rotational speed sensor 66 detects a turbine rotational speed NT (that is equal to a rotational speed Nin of the input shaft 22). The brake switch 68 determines whether a foot brake, which is a main brake, has been operated. The lever position sensor 74 detects a lever position (operation position) PSH at which the shift lever 72 is placed. The E-position switch 76 determines whether the shift lever 72 has been moved to position "E". The electronic control unit 100 receives signals indicating the engine rotational speed NE, the opening amount θTH of the throttle valve, the engine coolant temperature Tw, the vehicle speed V, the turbine rotational speed NT, the lever position PSH of the shift lever 72, a Decel command, a Can-Decel command, and the like from the aforementioned sensors and switches. The electronic control unit 100 also receives a signal indicating whether the brake has been operated, a signal indicating whether the shift lever 72 has been moved to the position "E", a signal indicating whether the vehicle 8 is towing the trailer 48, a disabled vehicle, or the like.

The towing switch 84 is disposed, for example, on an instrument panel near a driver's seat. When the vehicle 8 tows the trailer 48 (FIG. 1b), a disabled vehicle, or the like, the driver turns on the towing switch 84 so that the towing switch 84 outputs a towing signal. The towing signal indicates that the vehicle 8 is towing the trailer 48 or the like. If the driver does not turn-on the towing switch 84 even when the vehicle 8 is towing the trailer 48 or the like, the towing switch 84 does not output the towing signal. That is, the level of deceleration performance (i.e., the braking force corresponding to the level of request for deceleration) is changed based on whether the towing signal has been output during the deceleration control. Accordingly, the driver can select whether to change the level of deceleration performance by operating towing switch 84.

Figure 5:
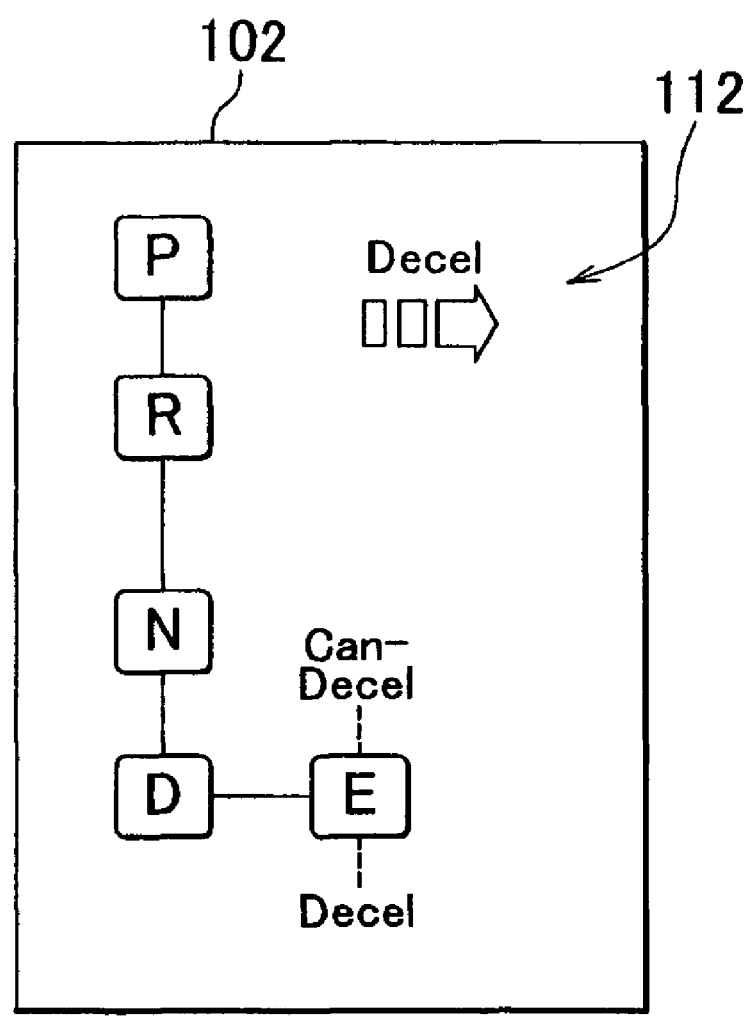
FIG. 5 is a diagram showing an example of a lever position indicator and a deceleration indicator.

The electronic control unit 100 is also connected to a lever position indicator 102, a deceleration indicator 112, and the like. The lever position indicator 102 is provided, for example, on the instrument panel. For example, as shown in FIG. 5, operation position of the shift lever 72 is lit in the lever position indicator 102. A current target deceleration is indicated in a graphic form in the deceleration indicator 112.

The electronic control unit 100 includes a microcomputer. The microcomputer includes a CPU, RAM, ROM, and an input/output interface. The CPU performs signal processing according to programs that are prestored in the ROM, using the temporary storage function of the RAM, thereby executing an output control for the engine 30, a powering control or a regenerative control for the motor-generator 32, and a shifting control for the automatic transmission 10. As a result, the vehicle 8 can run in a plurality of driving modes in which the operating states of the engine 30 and the motor-generator 32 are different. For example, the plurality of driving modes include an engine running mode, a charge running mode, a engine-motor running mode, a motor running mode, and a deceleration control mode (E-mode). In the engine running mode, only the engine 30 generates the driving force. In the charge running mode, the engine 30 generates the driving force, and the regenerative control for the motor-generator 32 is executed to charge the battery 42 with electric power. In the engine-motor running mode, both the engine 30 and the motor-generator 32 generate the driving force. In the motor running mode, only the motor-generator 32 generates the driving force. In the deceleration control mode (E-mode), the supply of fuel to the engine 30 is stopped to apply the engine brake, and a predetermined power-source brake is applied by executing the powering control or the regenerative control for the motor-generator 32 and by changing the shift speed of the automatic transmission 10.

When the electronic control unit 100 executes the output control for the engine 30, the electronic control unit 100 controls operation of the electronic throttle valve, a fuel injection device, and an ignition device such as an igniter. By controlling the fuel injection device, the amount of injected fuel is controlled. By controlling the ignition device, the ignition timing is controlled. In the control of the electronic throttle valve, a throttle actuator is operated based on the actual accelerator-pedal operation amount Acc so that the opening amount θTH of the throttle valve increases as the accelerator-pedal operation amount Acc increases.

Figure 6:
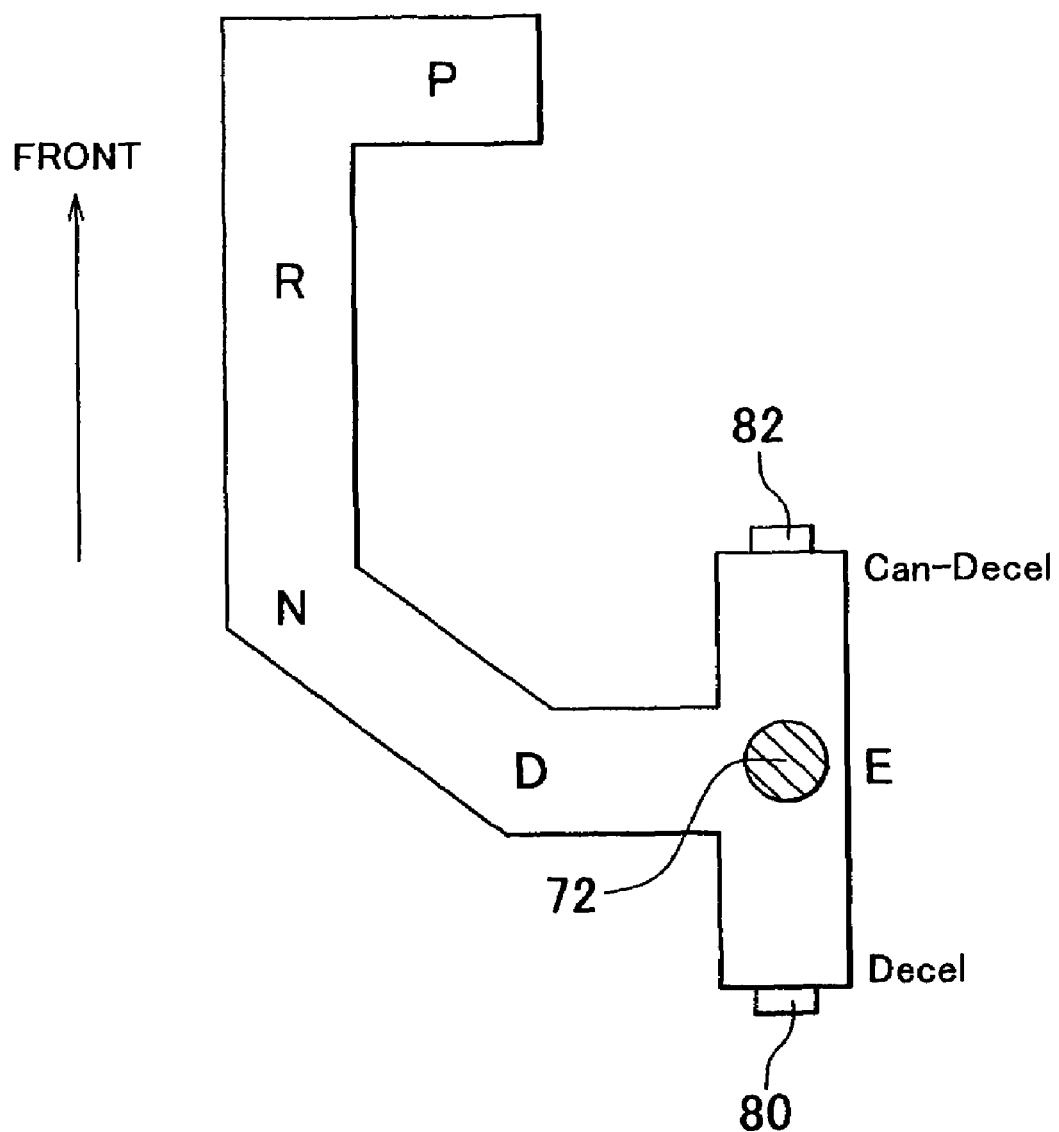
FIG. 6 is a diagram showing an example of a shift pattern for the shift lever.

The shifting control for the automatic transmission 10 is executed based on the lever position PSH of the shift lever 72. The shift lever 72 is provided in a center console portion near the driver's seat. For example, the shift lever 72 is moved to one of positions "P (parking)", "R (reverse)", "N (neutral)", "D (drive)", and "E" that are arranged in a shift pattern shown in FIG. 6. The lever position sensor 74 detects the position of the shift lever 72 when the shift lever 72 is at one of positions "P", "R", "N", and "D". The E-position switch 76 determines whether the shift lever 72 is at the position "E". A position "Can-Decel" is provided in front of the lever-position "E". A position "Decel" is provided behind the lever-position "E". The positions "Can-Decel" and "Decel" are used to adjust the level of request for deceleration.

When the shift lever 72 is at the position "P", the vehicle 8 is parked. The automatic transmission 10 interrupts power transmission. By moving the shift lever 72 to the position "P", for example, the output shaft 24 is mechanically fixed by a parking lock mechanism or the like to stop the rotation of the output shaft 24, that is, the rotation of the drive wheels. When the shift lever 72 is at the position "R", the vehicle 8 is in reverse. By moving the shift lever 72 to the position "R", for example, the state of a manual valve is mechanically changed to achieve the reverse speed "Rev1" or "Rev2" of the automatic transmission 10. When the shift lever 72 is at the position "N", power transmission is interrupted. By moving the shift lever 72 to the position "N", for example, the state of the manual valve is mechanically changed to disengage the clutches C1 to C4 and the brakes B1 and B2 of the automatic transmission 10. As a result, power transmission is interrupted.

Figure 7:
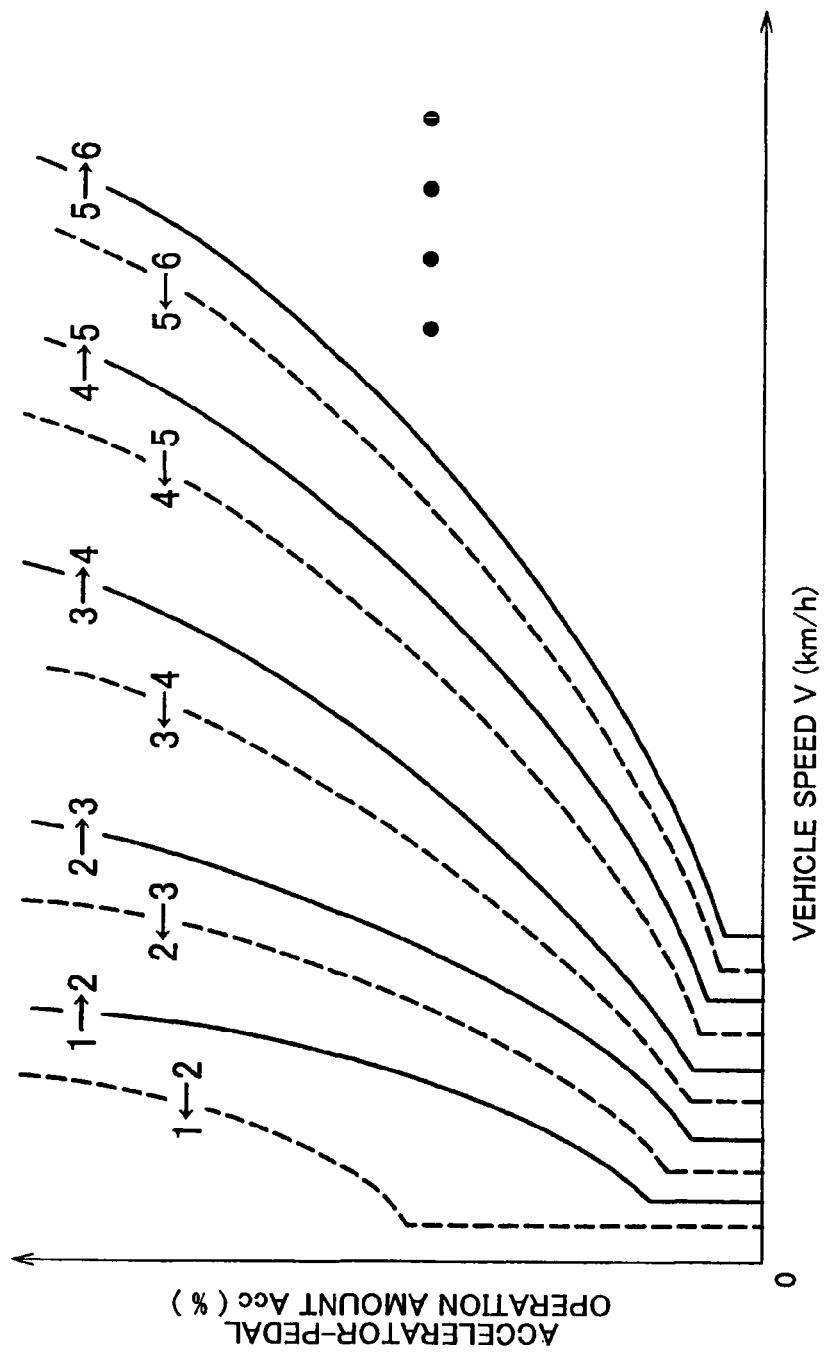
FIG. 7 is a diagram showing an example of a shift map used to automatically change the forward speed of the automatic transmission in FIG. 1.

When the shift lever 72 is at the position "D", one of the forward speeds is automatically selected, and the vehicle runs forward. By moving the shift lever 72 to the position "D", for example, the state of the manual valve is mechanically changed so that any one of the first forward speed "$1^{st}$" to the eighth forward speed "$8^{th}$" can be selected. Thus, an automatic shifting mode is selected. In the automatic shifting mode, automatic shifting is performed using all of the first forward speed "$1^{st}$" to the eighth speed "$8^{th}$". In other words, when it is determined that the shift lever 72 is moved to operation position "D", based on the signal from the lever position sensor 74, the automatic shifting mode is electrically set, and the shifting control is executed using all of the first forward speed "$1^{st}$" to the eighth speed "$8^{th}$". More specifically, by energizing or de-energizing a plurality of AT solenoids provided in a hydraulic control circuit (not shown), the state of a hydraulic circuit is changed to change the operating states of the clutches C1 to C4, and the brakes B1 and B2 as shown in FIG. 2B. As a result, any one of the first forward speed "$1^{st}$" and the eighth forward speed "$8^{th}$" is selected. This shifting control is executed based on a shifting condition that is defined, for example, in a map shown in FIG. 7. In the map, the vehicle speed V and the accelerator-pedal operation amount Acc are used as parameters. The map is stored in advance. As the vehicle speed V decreases, or as the accelerator-pedal operation amount Acc increases, the forward speed decreases, that is, the speed ratio increases.

When the shift lever 72 is at operation position "E", the E-mode, that is, the deceleration control mode is selected. In the E-mode, the deceleration is controlled according to the manual operation performed by the driver. The Can-Decel switch 82 is provided at the position "Can-Decel" in front of the position "E". The Decel switch 80 is provided at the position "Decel" behind the position "E". The Can-Decel switch 82 determines whether the shift lever 72 has been tilted to the position "Can-Decel". The Decel switch 80 determines whether the shift lever 72 has been tilted to the position "Decel". The level of request for deceleration continuously increases or decreases according to the time period during which the shift lever 72 is tilted (or kept tilted) to the position "Can-Decel" or "Decel". The deceleration control is executed based on the level of request for deceleration. The shift lever 72 is automatically returned from the position "Can-Decel" or the position "Decel" to the position "E" by force-applying means such as a spring. Each of the Can-Decel switch 82 and the Decel switch 80 is an automatic-return type ON-OFF switch, and is automatically turned OFF by force-applying means such as a spring. The E-position switch 76 remains ON, and the E-mode continues to be selected even after the shift lever 72 is tilted to the position "Can-Decel" or "Decel". In this embodiment, the shift lever 72 functions as the deceleration-request operating member.

Figure 8:
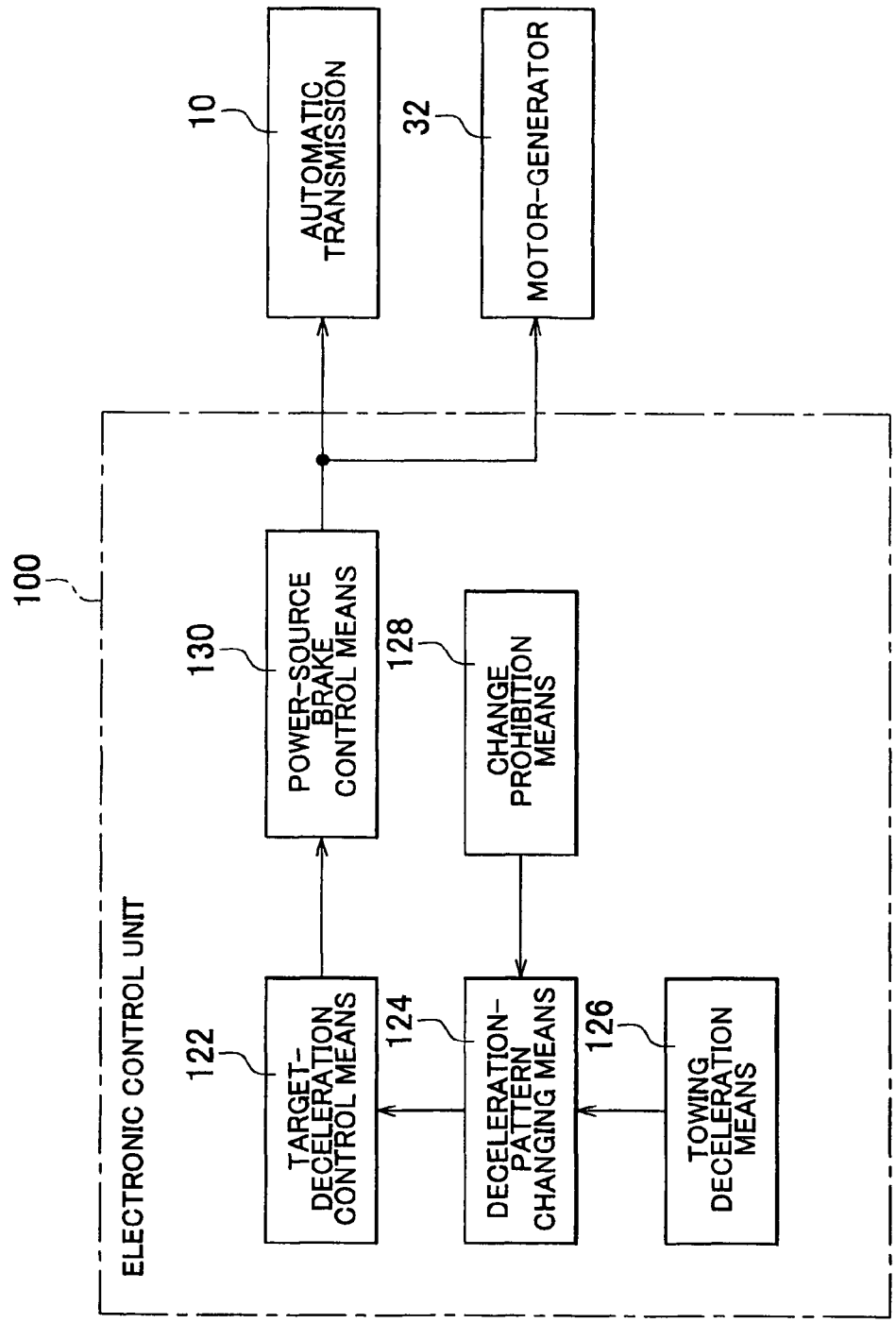
FIG. 8 is a block diagram explaining the functions of an electronic control unit in FIG. 4, which are used to execute a deceleration control.
Figure 10:
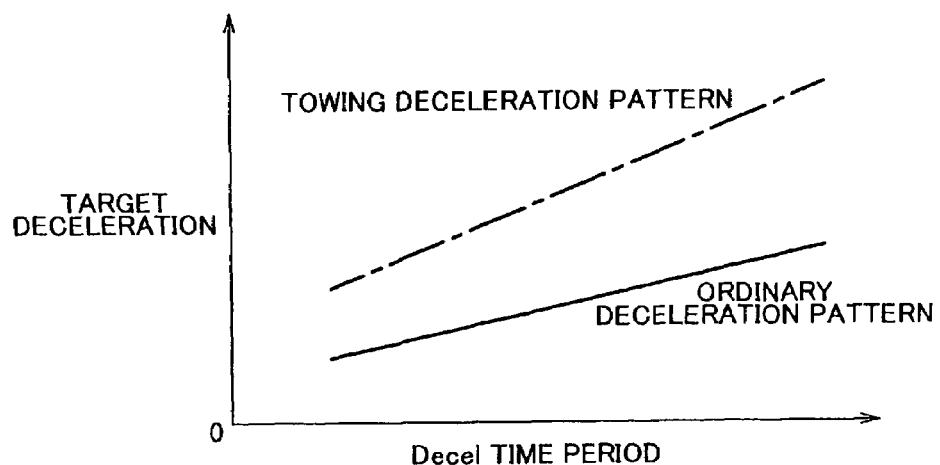
FIG. 10 is a graph showing examples of deceleration patterns that are used to set a target deceleration based on a Decel time period.

As shown in a function block diagram in FIG. 8, the electronic control unit 100 includes a target-deceleration control means 122, a deceleration-pattern changing means 124, a towing determination means 126, a change prohibition means 128, and a power-source brake control means 130 in terms of functions. When the shift lever 72 is at the position "E" and is tilted to the position "Decel", the target-deceleration control means 122 increases the target deceleration according to the time period during which the shift lever 72 is tilted to the position "Decel", as shown in FIG. 10. When the shift lever 72 is tilted to the position "Can-Decel", the target-deceleration control means 122 decreases the target deceleration according to the time period during which the shift lever 72 is tilted to the position "Can-Decel". FIG. 10 shows examples of deceleration patterns used to set the target deceleration based on the time period during which the shift lever 72 is tilted to the position "Decel" (hereinafter, this time period will be referred to as "Decel time period"). The deceleration pattern is considered as the relation between the target deceleration and the mode of operation performed by the driver (i.e., the level of request for deceleration). In this embodiment (FIG. 10), two deceleration patterns (a towing deceleration pattern and an ordinary deceleration pattern) are provided. The towing deceleration pattern indicated by a chain line is used when the vehicle 8 is towing the trailer 48 or the like. The ordinary deceleration pattern indicated by a solid line is used when the vehicle 8 is not towing the trailer 48 or the like. The target deceleration and the rate of change in the target deceleration in the towing deceleration pattern are larger than those in the ordinary deceleration pattern. That is, when the towing deceleration pattern is used, the target deceleration is set to a large value and a large braking force is generated as compared to when the ordinary deceleration pattern is used, even if the shift lever 72 is tilted to the position "Decel" for the same time period as when the ordinary deceleration pattern is used. When the vehicle 8 is towing the trailer 48 or the like, the vehicle weight is increased, which decreases the braking performance (the actual deceleration corresponding to the braking force). As a result, the intended deceleration may not be provided. Therefore, by increasing the target deceleration and the rate of change in the target deceleration, the braking force corresponding to the level of request for deceleration is greatly changed. Thus, the intended deceleration can be achieved quickly. In the embodiment, the target-deceleration control means 122 and the shift lever 72 constitute the target-deceleration setting means.

In the deceleration pattern in FIG. 10, the Decel time period is a total time period during which the shift lever 72 is tilted to the position "Decel". If the shift lever 72 is kept tilted to the position "Decel", the Decel time period increases, and the target deceleration continuously increases with the increase in the time period during which the shift lever 72 is kept tilted. If the shift lever 72 is operated for a short time period repeatedly, the Decel time period increases stepwise, and the target deceleration increases stepwise. In the case where the shift lever 72 is tilted to the position "Can-Decel" to decrease the level of request for deceleration, when the vehicle 8 is towing the trailer 48 or the like, the target deceleration is decreased at the rate different from the rate at which the target deceleration is decreased when the vehicle 8 is not towing the trailer 48 or the like, according to, for example, the deceleration patterns shown in FIG. 10. However, when the shift lever 72 is tilted to the position "Can-Decel", the rate of change in the target deceleration does not necessarily need to be the same as the rate of change in the target deceleration when the shift lever 72 is tilted to the position "Decel". Also, the target deceleration may be decreased at a constant rate, regardless of whether the vehicle 8 is towing the trailer 48 or the like. In FIG. 10, the target deceleration linearly changes according to the Decel time period. However, a deceleration pattern in which the target deceleration changes non-linearly may be provided. For example, the rate of change in the target deceleration may increase as the Decel time period increases.

Figure 11:
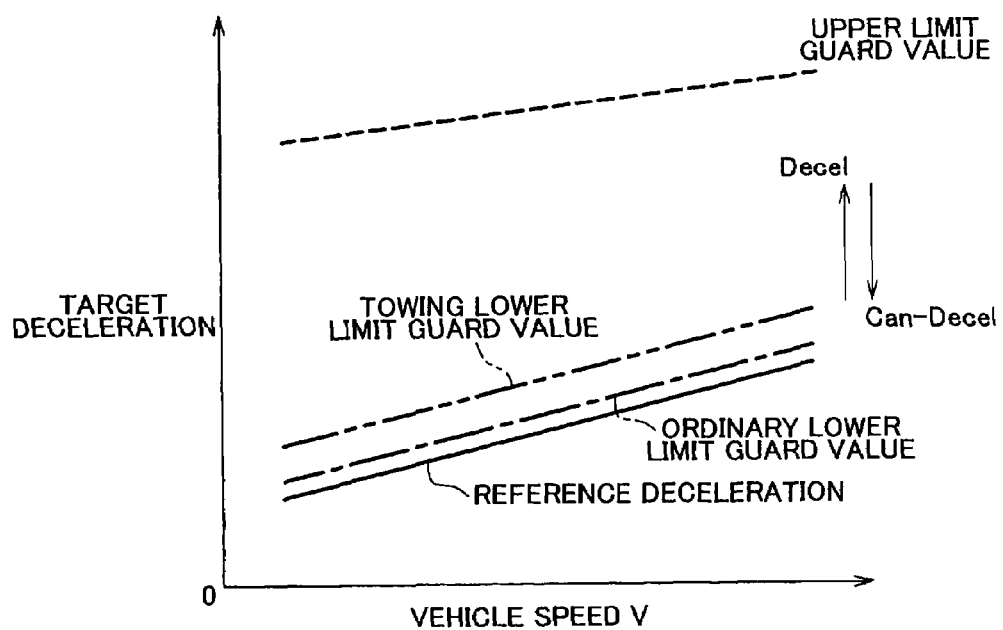
FIG. 11 is a graph explaining the target deceleration set by a target-deceleration control means in FIG. 8.

As shown in FIG. 11, the target deceleration increases with the increase in the vehicle speed V that is used as the parameter. In FIG. 11, a solid line indicates a reference deceleration when the deceleration control is not executed. That is, the reference deceleration is achieved in the case where the shift lever 72 is at the position "D" so that the automatic shifting mode is selected, the accelerator pedal 50 is released so that the vehicle 8 runs by inertia, fuel supply is stopped, and only the engine brake is applied. In this case, the reference deceleration increases with the increase in the vehicle speed V. When the vehicle 8 is not towing the trailer 48 or the like, after the shift lever 72 is moved to the position "E", the target deceleration is set to an ordinary lower limit guard value (default value) that is slightly larger than the reference deceleration, as indicated by a chain line. When the vehicle 8 is towing the trailer 48 or the like, after the shift lever 72 is moved to the position "E", the target deceleration is set to a towing lower limit guard value (default value) that is larger than the ordinary lower limit guard value, as indicated by a two-dot chain line. Even if the shift lever 72 is tilted to the position "Can-Decel" repeatedly, the target deceleration does not become smaller than the ordinary lower limit guard value or the towing lower limit guard value. When the shift lever 72 is tilted to the position "Decel" or the position "Can-Decel", the target deceleration is increased or decreased to a value larger than or equal to the lower limit guard value, according to the deceleration pattern in FIG. 10. A portion of the target-deceleration control means 122, which sets the ordinary lower limit guard value and the towing lower limit guard value, is considered as the lower-limit-value setting means.

If the target deceleration is excessively large, the engine rotational speed NE exceeds the designated maximum speed during downshifting, and the load applied to the motor-generator 32 becomes excessively large. Therefore, in this embodiment, an upper limit guard value of the target deceleration is set, as indicated by a dashed line in FIG. 11. Also, the target deceleration may be set using parameters indicating the driving condition, such as a road surface gradient and a steering angle, in addition to the vehicle speed V. For example, when the vehicle 8 runs on a downward slope, the target deceleration may be set to a large value, as compared to when the vehicle 8 runs on a flat road. The default value that is set after the shift lever 72 is moved to the position "E" may be used as the reference deceleration, in both in the case where the vehicle 8 is towing the trailer 48 or the like, and the case where the vehicle 8 is not towing the trailer 48 or the like. Each of the towing lower limit guard value and the ordinary lower limit guard value may be a lower limit value when the shift lever 72 is tilted to the position "Can-Decel" to decrease the target deceleration after the shift lever 72 is tilted to the position "Decel" to increase the target deceleration. That is, in this case, the target deceleration does not become smaller than the towing lower limit guard value or the ordinary lower limit guard value when the shift lever 72 is tilted to the position "Can-Decel" to decrease the target deceleration after the shift lever 72 is tilted to the position "Decel" to increase the target deceleration.

Figure 12:
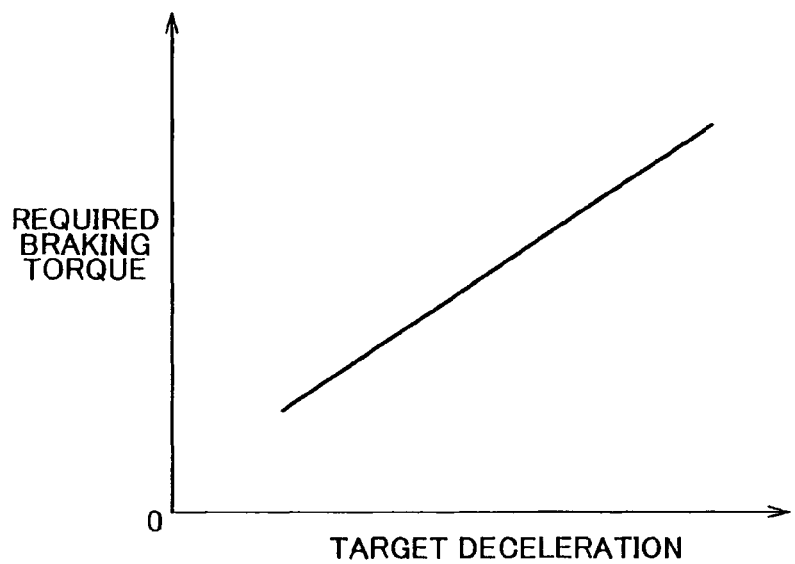
FIG. 12 is a graph showing an example of a data map that is used to obtain required braking torque based on the target deceleration.

After the target deceleration is set in the aforementioned manner, the power-source brake control means 130 calculates required braking torque based on the target deceleration, and controls the power-source brake based on the required braking torque. The power-source brake control means 130 is considered as the deceleration control means. The required braking torque is determined using a data map or an equation that is set in advance. The required braking torque increases as the target deceleration increases as indicated by a solid line in FIG. 12. The required braking torque is set, regardless of whether the foot brake is operated, and regardless of foot brake force. The power-source braking torque does not change based on whether the foot brake is operated. Because the braking torque generally changes according to the target deceleration linearly, the target deceleration itself may be regarded as the required braking torque, that is, the power-source braking torque may be directly determined based on the target deceleration.

Figure 13:
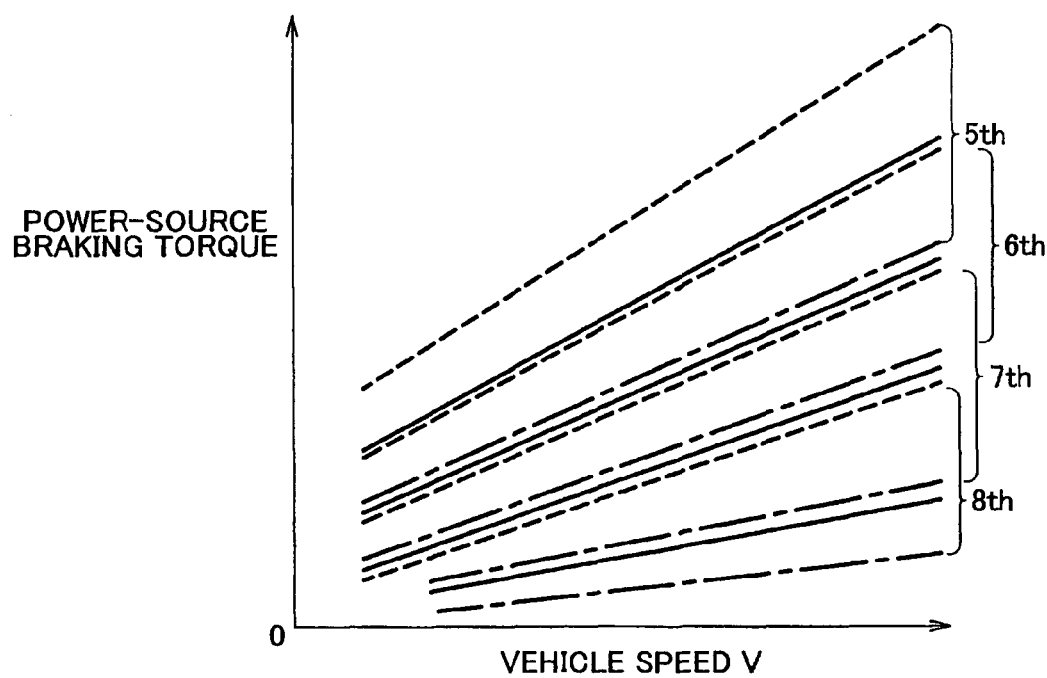
FIG. 13 is a graph explaining power-source braking torque that is generated based on a vehicle speed, by controlling the torque of an engine brake and a motor-generator.

When the power-source brake is controlled based on the required braking torque, the power-source braking torque is obtained by summing engine braking torque and powering torque or regenerative torque of the motor-generator 32. The engine braking torque changes according to the shift speed of the automatic transmission 10. The engine braking torque indicated by a solid line is generated at each forward speed. By executing the regenerative control for the motor-generator 32, the power-source braking torque can be increased in a range indicated by a dashed line in accordance with the regenerative torque of the motor-generator 32 at each forward speed. Also, by executing the powering control for the motor-generator 32, the power-source braking torque can be decreased in a range indicated by a chain line in accordance with the powering torque at each forward speed. The ranges of the power-source braking torque generated at the forward speeds may overlap with each other. Basically, the intended braking torque is generated while the battery 42 is charged with electric power by executing the regenerative control for the motor-generator 32. However, when the battery 42 is fully charged and cannot be charged with electric power, the engine braking torque is increased by decreasing the shift speed, and the braking torque is decreased by executing the powering control for the motor-generator 32. As a result, the intended braking torque can be generated. FIG. 13 shows the power-source braking torque at each of the fifth forward speed "5$^{th}$" to the eighth forward speed "8$^{th}$", and does not show the power-source braking torque at each of the first forward speed "1$^{st}$" to the fourth forward speed "4$^{th}$". However, the power-source braking torque can be similarly increased or decreased at each of the first forward speed "1$^{st}$" to the fourth forward speed "4$^{th}$". Further, larger power-source braking torque can be generated at each of the first forward speed "1$^{st}$" to the fourth forward speed "4$^{th}$".

Referring to FIG. 8 again, the deceleration-pattern changing means 124 changes the deceleration pattern shown in FIG. 10 and the lower limit guard value shown in FIG. 11, based on whether the vehicle 8 is towing the trailer 48 or the like. The deceleration-pattern changing means 124 is considered as the relation changing means. The deceleration-pattern changing means 124 executes signal processing according to the flowchart in FIG. 9. In the flowchart in FIG. 9, step S2 is executed by the change prohibition means 128, and step S3 is executed by the towing determination means 126. The towing determination means 126 is considered as the vehicle weight determination means and the tow determination means. In this embodiment, the deceleration pattern is changed when the condition relating to the vehicle weight, or the condition relating to whether the vehicle 8 is towing the trailer 48 or the like is satisfied.

Figure 9:
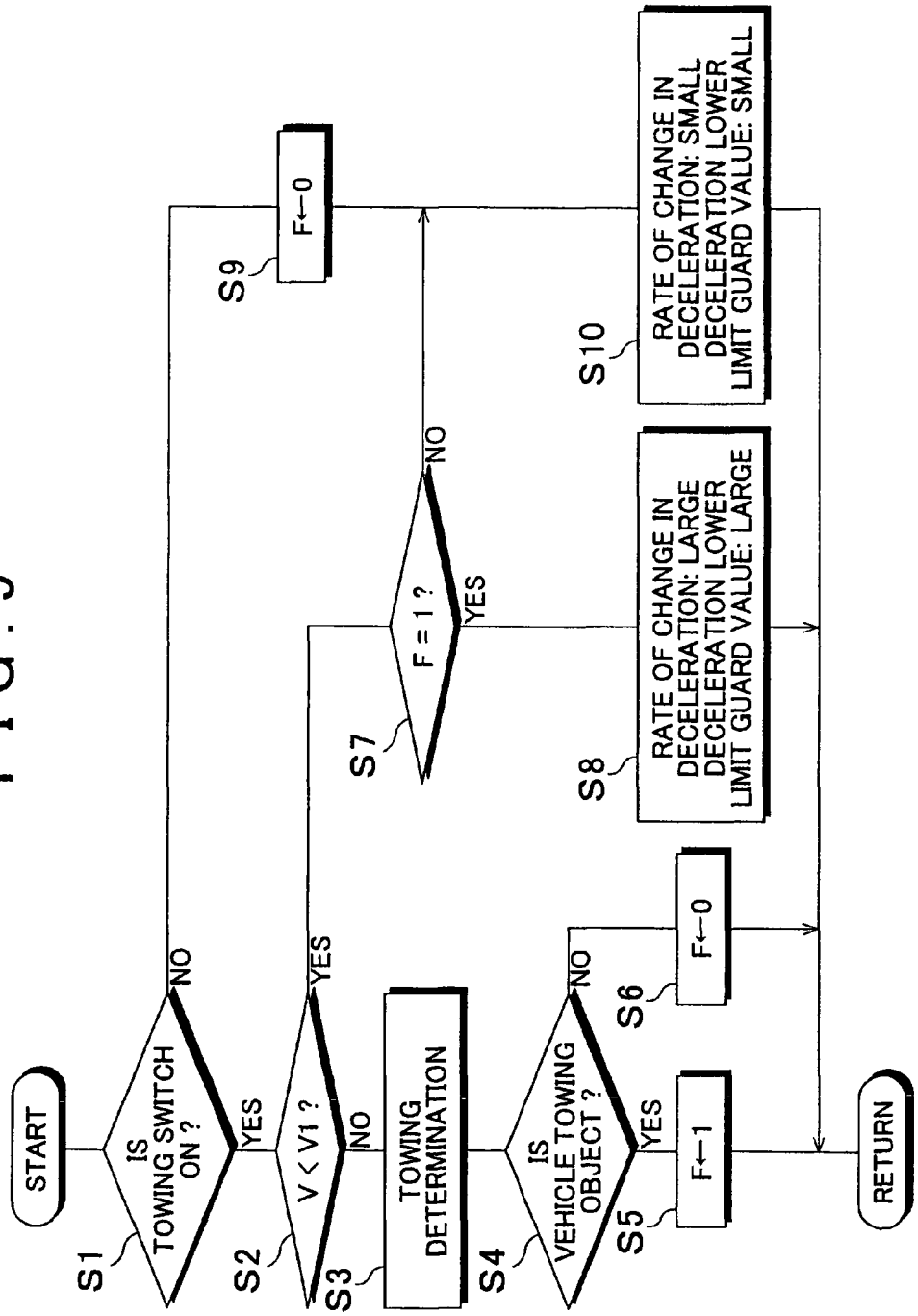
FIG. 9 is a flowchart specifically explaining signal processing performed by a deceleration-pattern changing means in FIG. 8.

In step S1 in the flowchart in FIG. 9, it is determined whether the towing switch 84 is ON. If it is determined that the towing switch 84 is ON, step S2 and subsequent steps are executed. If it is determined that the towing switch 84 is OFF, the value of a towing flag F is set to "0" in step S9, and then step S10 is executed. The value "0" of the towing flag F indicates that the vehicle 8 is not towing the trailer 48 or the like. In step S10, the ordinary deceleration pattern (indicated by the solid line in FIG. 10) is selected. In the ordinary deceleration pattern, the rate of change in the target deceleration with respect to the level of request for deceleration (Decel time period) is small. In addition, the ordinary lower limit guard value (indicated by the chain line in FIG. 11) is selected as the lower limit guard value of the target deceleration. The ordinary lower limit guard value is smaller than the towing lower limit guard value. That is, when the driver has not turned the towing switch 84 on, importance is placed on the driver's intention and the deceleration control is executed according to the ordinary deceleration pattern, regardless of whether the vehicle 8 is actually towing the trailer 48 or the like. Accordingly, when the vehicle 8 is actually towing the trailer 48 or the like, the level of deceleration performance (i.e., deceleration) achieved based on the level of request for deceleration is reduced in accordance with the increase in the vehicle weight. However, by increasing the time period during which the shift lever 72 is kept tilted to the position "Decel", or by tilting the shift lever 72 to the position "Decel" repeatedly, a required deceleration can be achieved.

Step S2 is executed when the towing switch 84 has been turned on. In step S2, it is determined whether the vehicle speed V is lower than or equal to a predetermined vehicle speed V1 (for example, 5 km/h) to determine whether the vehicle 8 is stationary. If the vehicle 8 is not stationary, a towing determination is made in step S3. If the vehicle 8 is stationary, step S7 and subsequent steps are executed, and the deceleration pattern and the lower limit guard value of the target deceleration are changed, as required.

In the towing determination in step S3, the vehicle weight is calculated based on the operating states of the power sources (i.e., the engine 30 and the motor-generator 32) that are used in the power-source brake control executed by the power-source brake control means 130, the shift speed (speed ratio) of the automatic transmission 10, the change in the vehicle speed, and the like, according to an equation, a map, or the like that is set in advance taking into account the speed reduction ratio of a final reduction gear unit, the diameter of the driving wheel, power transmission efficiency, and the like. Then, it is determined whether the vehicle weight is larger than or equal to a predetermined determination value to determine whether the vehicle 8 is towing the trailer 48 or the like. The method of calculating the vehicle weight, for example, when the hybrid vehicle 8 is driven (accelerated) will be described specifically. The relation among the driving force, the vehicle weight, and the acceleration is represented by the following equation (1).

$$F = M \times a \quad (1)$$

In this equation (1), "F" is the driving force, "M" is the vehicle weight, and "a" is the acceleration. The driving force F is represented by the following equation (2).

$$F = T \times i \times A \quad (2)$$

In this equation (2), "T" is the power-source torque, "i" is the speed ratio of the automatic transmission 10, and "A" is a coefficient that is determined for each vehicle, based on the speed reduction ratio of the final reduction gear unit, the diameter of the driving wheel, the power transmission efficiency, and the like. Therefore, the vehicle weight M is basically obtained using the following equation (3).

$$M = (T \times i \times A)/a \quad (3)$$

The power-source torque T is obtained by summing the engine torque and the motor torque. The engine torque is obtained based on the amount of air taken into the engine 30, the rotational speed of the engine 30, the opening amount of the throttle valve, and the like. The motor torque is obtained based on motor current, and the like.

Running resistance changes according to the vehicle speed V. The acceleration (change in the vehicle speed) "a" is influenced by driving conditions, i.e., the road surface gradient, the steering angle, the road surface friction coefficient μ, and the like. Therefore, the vehicle weight M may be calculated taking into account the aforementioned parameters. Alternatively, the towing determination may be prohibited if a certain condition for prohibiting the towing determination is satisfied. For example, the towing determination may be prohibited if the road surface gradient or the steering angle is larger than or equal to a predetermined angle, or if the drivewheels 40 are spinning. Also, the vehicle weight M may be obtained taking into account the torque ratio of the torque converter 34, which is determined based on the rotational speed ratio. The towing determination may be made while the lock-up clutch is engaged.

The vehicle weight M may be obtained based on the power-source braking torque determined based on the operating states of the engine 30 and the motor-generator 32, the speed ratio "i" of the automatic transmission 10, the actual change in the vehicle speed, and the like when the power-source brake is applied while the deceleration control is executed or while the vehicle 8 is coasting with the accelerator pedal released.

After the towing determination is made, step S4 is executed. If it is determined that the vehicle 8 is towing the trailer 48 or the like, the value of the towing flag F is set to "1" to indicate that the vehicle 8 is towing the trailer 48 or the like in step S5. If it is determined that the vehicle 8 is not towing the trailer 48 or the like, the value of the towing flag F is set to "0" in step S6. That is, even when the driver turns the towing switch 84 on, if it is determined that the vehicle 8 is not towing the trailer 48 or the like in step S4, the value of the towing F is set to "0", and the deceleration pattern and the deceleration lower limit guard value are prohibited from being changed.

If the vehicle speed V is lower than the predetermined vehicle speed V1 and an affirmative determination is made in step S2, it is determined whether the value of the towing flag F is "1" in step S7. If the value of the towing flag F is "1", that is, if the vehicle 8 is actually towing the trailer 48 or the like, the towing deceleration pattern (indicated by the chain line in FIG. 10) is selected, and the towing lower limit guard value (indicated by a chain double-dashed line in FIG. 11) is selected as the lower limit guard value of the target deceleration in step S8. In the towing deceleration pattern, the rate of change in the target deceleration with respect to the level of request for deceleration is larger than that in the ordinary deceleration pattern. The towing lower limit guard value is larger than the ordinary lower limit guard value. The deceleration indicator 112 or the like may indicate that the deceleration control is being executed while the vehicle 8 is towing the trailer 48 or the like. If the value of the towing flag F is "0", that is, if the vehicle 8 is not actually towing the trailer 48 or the like, step S10 is executed. In step S10, the ordinary deceleration pattern (indicated by the solid line in FIG. 10) is selected, and the ordinary lower limit guard value (indicated by the chain double-dashed line in FIG. 11) is selected as the lower limit guard value of the target deceleration. In the ordinary deceleration pattern, the rate of change in the target deceleration is smaller than that in the towing deceleration pattern. The ordinary lower limit guard value is smaller than the towing lower limit guard value.

Thus, in the deceleration control apparatus according to the embodiment, in step S3, the vehicle weight is calculated based on the actual running state of the hybrid vehicle 8, and it is determined whether the vehicle 8 is towing the trailer 48, a disabled vehicle, or the like. Then, the deceleration pattern (in FIG. 10) is changed based on whether the vehicle 8 is towing the trailer 48 or the like. This changes the target deceleration set based on the mode of operation of the shift lever 72 (i.e., the Decel time period, or the Can-Decel time period). Therefore, it is possible to achieve the intended level of deceleration performance that matches the level of driver's request for deceleration (i.e., Decel time period), regardless of whether the vehicle weight is changed by towing the trailer 48 or the like. This improves usability of the deceleration control.

Also, in the deceleration control in the embodiment, it is determined whether the vehicle 8 is towing the trailer 48 or the like (i.e., the vehicle weight is determined) based on the operating states of the power sources for driving the vehicle 8 (i.e., the operating states of the engine 10 and the motor-generator 32), the shift speed (speed ratio "i") of the automatic transmission 10, the change in the vehicle speed, and the like. The operating states of the power sources are controlled by the power-source brake control means 130. Then, the deceleration pattern is changed based on whether the vehicle 8 is towing the trailer 48 or the like (i.e., based on the vehicle weight). Therefore, the deceleration control is more appropriately executed based on the vehicle weight, using the power-source brake.

As described above, it is determined whether the vehicle 8 is towing the trailer 48 or the like (i.e., the vehicle weight is determined) based on the operating states of the power sources for driving the vehicle 8 (i.e., the operating states of the engine 10 and the motor-generator 32), the shift speed (speed ratio "i") of the automatic transmission 10, the change in the vehicle speed, and the like. This obviates the necessity of providing a sensor such as a weight sensor or a towing load sensor. Therefore, the deceleration control apparatus can be easily configured at low cost. Further, it is possible to reduce the possibility that the vehicle weight is erroneously determined, and whether the vehicle 8 is towing the trailer 48 or the like is erroneously determined due to electric failure in such a sensor. Accordingly, high reliability can be provided.

Also, in this embodiment, the deceleration pattern is changed. As a result, when the vehicle 8 is towing the trailer 48 or the like, the target deceleration and the rate of change in the target deceleration are large as compared to when the vehicle 8 is not towing the trailer 48. Therefore, when the vehicle weight is increased by towing the trailer 48 or the like, a large braking force can be generated and the intended level of deceleration performance can be achieved quickly by operating the shift lever 72 in the same manner as when the vehicle 8 is not towing the trailer 48 (i.e., by tilting the shift lever 72 to the position "Decel" for the same time period as when the vehicle 8 is not towing the trailer 48).

Also, in this embodiment, when the vehicle 8 is towing the trailer 48 or the like, the lower limit guard value of the target deceleration is larger than that when the vehicle 8 is not towing the trailer 48 or the like. Therefore, when the vehicle weight is increased by towing the trailer 48 or the like, the target deceleration is set to a large value from the beginning, a large braking force can be generated, and the intended level of deceleration performance can be achieved quickly. Also, even if the shift lever 72 is tilted to the position "Can-Decel" to decrease the target deceleration, the target deceleration is maintained at a large value, as compared to when the vehicle 8 is not towing the trailer 48 or the like. As a result, a large braking force that matches the vehicle weight can be generated. This improves usability of the deceleration control.

The towing determination is made in step S3 while the vehicle 8 is running. Therefore, the deceleration pattern and the lower limit guard value may be changed immediately while the vehicle is running. However, in this embodiment, if it is determined that the vehicle 8 is not stationary in step S2, the deceleration pattern and the lower limit guard value are not changed, though it is determined whether the vehicle 8 is towing the trailer 48 or the like. After the vehicle 8 stops, the deceleration pattern and the lower limit guard value are changed as required. This reduces the possibility that the level of deceleration performance (power-source brake) corresponding to the level of driver's request for deceleration (operation of the shift lever 72 to the position "Decel") is changed while the vehicle 8 is running, and therefore the degree of usability of the deceleration control decreases, and the driver feels uncomfortable.

In the aforementioned embodiment, the deceleration pattern and the lower limit guard value are changed when it is determined that the towing switch 84 is on in step S1 and it is determined that the vehicle 8 is towing the trailer 48 or the like in the towing determination in step S3. However, the deceleration pattern and the lower limit guard value may be changed based on only the determination made in step S1, or based on only the towing determination made in step S3.

Figure 14:
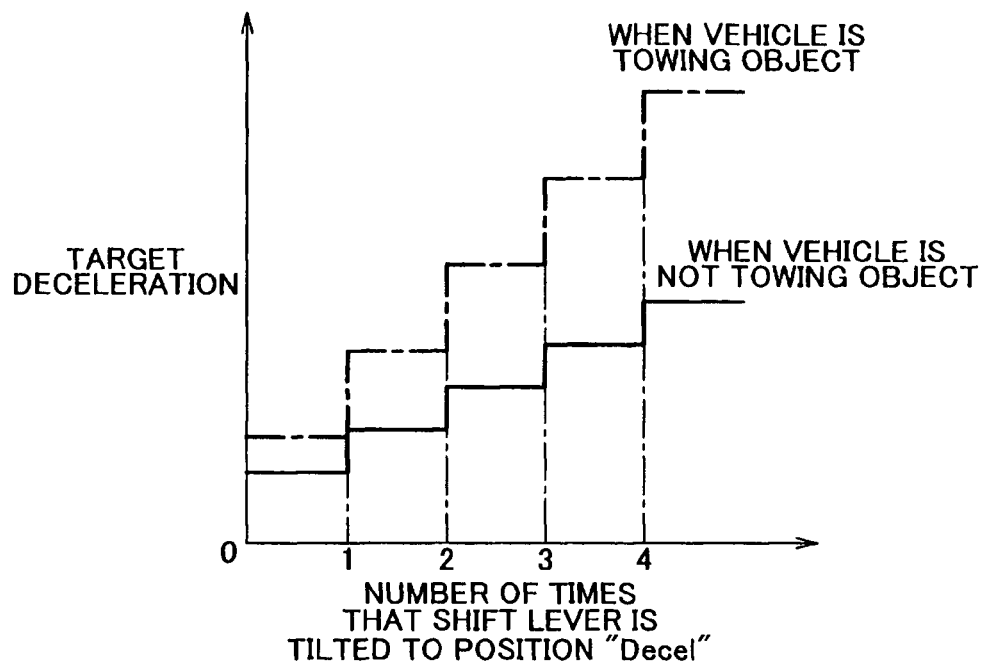
FIG. 14 is a graph showing examples of deceleration patterns that are used, instead of the deceleration patterns in FIG. 10, to set the target deceleration based on the number of times that the shift lever is tilted to a position "Decel"

In the aforementioned embodiment, the target deceleration is continuously changed based on the time period during which the shift lever 72 is tilted to the position "Decel" or "Can-Decel", as shown in FIG. 10. However, a deceleration pattern shown in FIG. 14 may be used. In the deceleration pattern shown in FIG. 14, the target deceleration is changed stepwise in accordance with a change in the number of times that the shift lever 72 is tilted. In this case, when the vehicle 8 is towing the trailer 48 or the like, the target deceleration is changed by a large amount each time the shift lever 72 is tilted (i.e., the target deceleration is changed in large steps), as compared to when the vehicle 8 is not towing the trailer 48 or the like. In FIG. 14, the target deceleration is changed by a constant amount each time the shift lever 72 is tilted. However, the amount, by which the target deceleration is changed each time the shift lever 72 is tilted, may be changed in accordance with the change in the number of times that the shift lever 72 is tilted. For example, the amount, by which the target deceleration is changed each time the shift lever 72 is tilted, may be increased with the increase in the number of times that the shift lever 72 is tilted.

Figure 15:
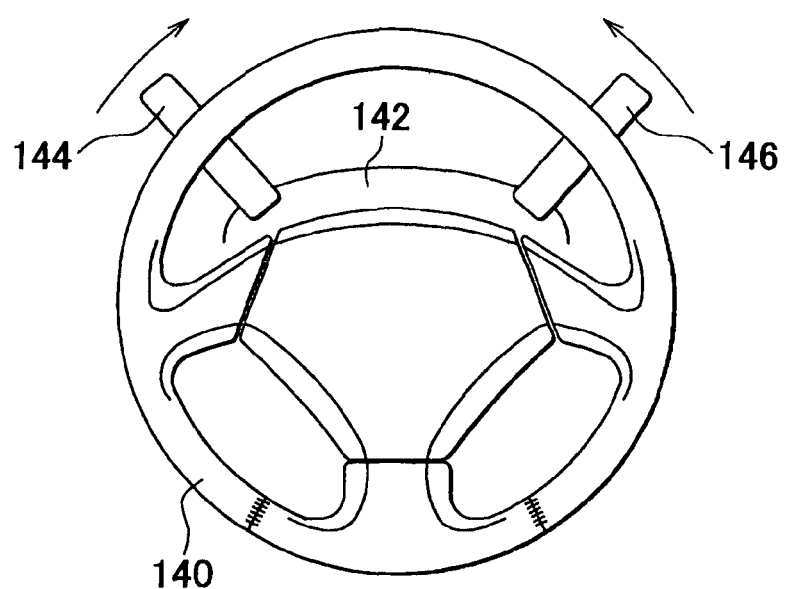
FIG. 15 is a diagram showing an example of a deceleration-request operating member provided on a steering column.

In the aforementioned embodiment, the shift lever 72 is used as the deceleration-request operating member, and the shift lever 72 and the target-deceleration control means 122 constitute the target-deceleration setting means. However, as shown in FIG. 15, a Decel lever 144 and a Can-Decel lever 146 may be provided on a steering column 142 near a steering wheel 140. In this case, when the Decel lever 144 or the Can-Decel lever 146 is rotated in a direction indicated by an arrow (i.e., the Decel lever 144 or the Can-Decel lever 146 is turned on), operation detection means (the Decel switch 80, the Can-Decel switch 82, or the like) detects the rotation of the Decel lever 144 or the Can-Decel lever 146, and outputs the request for deceleration. Each of the Decel lever 144 and the Can-Decel lever 146 is an automatic-return type lever. Each of the Decel lever 144 and the Can-Decel lever 146 is automatically returned to an original position (OFF-position) by force-applying means such as a spring. Further, because the Decel lever 144 and the Can-Decel lever 146 are provided on the steering column 142 that is fixed at a certain position, the driver can easily operate the Decel lever 144 and the Can-Decel lever 146 even while the driver operates the steering wheel 140. The Decel and Can-Decel levers 144 and 146 may be provided on the steering column 142 while the position "E" is provided for the shift lever 72. In this case, the Decel and Can-Decel levers 144 and 146, or the shift lever 72 can be selected to execute the deceleration control, according to the driver's preference or the driving state.

While various embodiments have been described, it is to be understood that the invention is not limited to the exemplary embodiments or constructions. Various changes and modifications can be made to the embodiments based on the knowledge of persons skilled in the art.

What is claimed is:

1. A deceleration control apparatus for a vehicle, the apparatus including a target-deceleration setting device which is operated by a driver of a vehicle, said target-deceleration setting device setting a target deceleration according to a predetermined relation between a mode of operation performed by the driver and a target deceleration; and a deceleration control unit for controlling a deceleration of the vehicle by changing a braking force based on the target deceleration set by the target-deceleration setting device, comprising:

a relation changing mechanism for changing the relation between the mode of operation performed by the driver and the target deceleration when a predetermined condition is satisfied; and a change prohibition mechanism for prohibiting a change in the relation between the mode of operation performed by the driver and the target deceleration when the vehicle exceeds a predetermined vehicle speed.

2. The deceleration control apparatus for a vehicle according to claim 1, further comprising:
a vehicle weight determination device for determining a vehicle weight, wherein
the predetermined condition relates to the vehicle weight, and the relation changing mechanism changes the relation based on the vehicle weight.

3. The deceleration control apparatus for a vehicle according to claim 2, further comprising a power source for driving the vehicle, wherein the deceleration control unit changes the braking force by controlling an operating state of said power source; and the vehicle weight determination device determines the vehicle weight based on the operating state of the power source and a change in the vehicle speed.

4. The deceleration control apparatus for a vehicle according to claim 3, wherein
the power source for driving the vehicle is an engine, and the deceleration control unit changes the braking force by controlling an operating state of the engine; and
the vehicle weight determination device determines the vehicle weight based on the operating state of the engine and the change in the vehicle speed.

5. The deceleration control apparatus for a vehicle according to claim 2, further comprising a transmission provided between a power source for driving the vehicle and a driving wheel, wherein
the deceleration control unit changes the braking force by controlling a speed ratio of said transmission; and
the vehicle weight determination device determines the vehicle weight based on the speed ratio of the transmission and the change in the vehicle speed.

6. The deceleration control apparatus for a vehicle according to claim 2, wherein
the vehicle weight determination device determines whether the vehicle is towing an object, based on a change in the vehicle weight; and
the relation changing mechanism changes the relation based on whether the vehicle is towing the object.

7. The deceleration control apparatus for a vehicle according to claim 6, wherein the relation changing mechanism changes the relation so that the target deceleration corresponding to the mode of operation performed by the driver is larger when the vehicle is towing an object, relative to when the vehicle is not towing the object.

8. The deceleration control apparatus for a vehicle according to claim 6, wherein the relation changing mechanism changes the relation so that the target deceleration corresponding to the mode of operation performed by the driver is changed in large steps when the vehicle is towing an object, relative to when the vehicle is not towing the object.

9. The deceleration control apparatus for a vehicle according to claim 6, wherein the relation changing mechanism changes the relation so that the target deceleration corresponding to the mode of operation performed by the driver is changed at a larger rate when the vehicle is towing an object, relative to when the vehicle is not towing the object.

10. The deceleration control apparatus for a vehicle according to claim 6, wherein the relation changing mechanism changes the relation so that a lower limit value of the target deceleration corresponding to the mode of operation performed by the driver is larger when the vehicle is towing an object, relative to when the vehicle is not towing the object.

11. The deceleration control apparatus for a vehicle according to claim 1, further comprising:
a tow determination unit for determining whether the vehicle is towing an object, wherein
the predetermined condition relates to whether the vehicle is towing the object, and the relation changing mechanism changes the relation based on whether the vehicle is towing the object.

12. The deceleration control apparatus for a vehicle according to claim 1, wherein the vehicle is a hybrid vehicle.

13. A deceleration control apparatus for a vehicle, the apparatus including a target-deceleration setting device which is operated by a driver of a vehicle, and which sets a target deceleration based on a mode of predetermined operation performed by the driver; and a deceleration control unit for controlling a deceleration of the vehicle by changing a braking force based on the target deceleration set by the target-deceleration setting device, the apparatus comprising:
a changing mechanism for changing the target deceleration set based on the mode of predetermined operation performed by the driver when a predetermined condition is satisfied; and
a change prohibition mechanism for prohibiting a change in the target deceleration set based on the mode of predetermined operation performed by the driver when the vehicle runs at a vehicle speed higher than a predetermined vehicle speed.

14. The deceleration control apparatus for a vehicle according to claim 13, further comprising:
a vehicle weight determination device for determining vehicle weight, wherein
the predetermined condition relates to the vehicle weight, and the changing mechanism changes, based on the vehicle weight, and the target deceleration set based on the mode of predetermined operation performed by the driver.

15. The deceleration control apparatus for a vehicle according to claim 14, wherein the deceleration control unit changes the braking force by controlling an operating state of a power source for driving the vehicle; and the vehicle weight determination device determines the vehicle weight based on the operating state of the power source and a change in the vehicle speed.

16. The deceleration control apparatus for a vehicle according to claim 15, wherein
the power source for driving the vehicle is an engine, and the deceleration control unit changes the braking force by controlling an operating state of the engine; and
the vehicle weight determination device determines the vehicle weight based on the operating state of the engine and the change in the vehicle speed.

17. The deceleration control apparatus for a vehicle according to claim 14, wherein
the deceleration control unit changes the braking force by controlling a speed ratio of a transmission provided between a power source for driving the vehicle and a drive wheel; and
the vehicle weight determination device determines the vehicle weight based on the speed ratio of the transmission and the change in the vehicle speed.

18. The deceleration control apparatus for a vehicle according to claim 14, wherein
the vehicle weight determination device determines whether the vehicle is towing an object, based on a change in the vehicle weight; and
the changing mechanism changes, based on whether the vehicle is towing the object, the target deceleration set based on the mode of predetermined operation performed by the driver.

19. The deceleration control apparatus for a vehicle according to claim 18, wherein the changing mechanism changes the target deceleration set based on the mode of predetermined operation performed by the driver so that the target deceleration is larger when the vehicle is towing an object, relative to when the vehicle is not towing the object.

20. The deceleration control apparatus for a vehicle according to claim 18, wherein the changing mechanism changes the target deceleration set based on the mode of predetermined operation performed by the driver so that the target deceleration is changed in large steps in accordance with a change in the mode of predetermined operation when the vehicle is towing an object, relative to when the vehicle is not towing the object.

21. The deceleration control apparatus for a vehicle according to claim 18, wherein the changing mechanism changes the target deceleration set based on the mode of predetermined operation performed by the driver so that the target deceleration is changed at a larger rate in accordance with a change in the mode of predetermined operation when the vehicle is towing an object, relative to when the vehicle is not towing the object.

22. The deceleration control apparatus for a vehicle according to claim 18, wherein the target-deceleration setting device includes a lower-limit-value setting unit for setting a lower limit value of the target deceleration; and the changing mechanism increases the lower limit value of the target deceleration set by the lower-limit-value setting unit when the vehicle is towing an object, as compared to when the vehicle is not towing the object.

23. The deceleration control apparatus for a vehicle according to claim 13, further comprising:

a tow determination unit for determining whether the vehicle is towing an object, wherein the predetermined condition relates to whether the vehicle is towing the object, and the changing mechanism changes, based on whether the vehicle is towing the object, the target deceleration set based on the mode of predetermined operation performed by the driver.

24. The deceleration control apparatus for a vehicle according to claim 13, wherein the vehicle is a hybrid vehicle.

25. A deceleration control method for a vehicle, comprising:

controlling a deceleration of the vehicle by changing a brake force based on a target deceleration;

changing the relation between a mode of operation performed by a driver of the vehicle and the target deceleration when a predetermined condition is satisfied; and determining whether the vehicle is towing an object, and changing the relation based on whether the vehicle is towing the object, wherein the predetermined condition relates to the vehicle's weight, and wherein said determining whether the vehicle is towing an object is based on a change in the vehicle's weight, the deceleration method further comprising prohibiting a change in the relation between the mode of operation performed by the driver and the target deceleration when the vehicle exceeds a predetermined vehicle speed.

26. The deceleration control method according to claim 25, wherein the relation is changed such that the target deceleration is larger when the vehicle is towing an object relative to when the vehicle is not towing the object.

* * * * *